(12) United States Patent
Simmons

(10) Patent No.: US 10,631,519 B2
(45) Date of Patent: Apr. 28, 2020

(54) PET GUIDE PLATFORM FOR A PET DOOR OPENING

(71) Applicant: William A. Simmons, Windsor, CT (US)

(72) Inventor: William A. Simmons, Windsor, CT (US)

( * ) Notice: Subject to any disclaimer, the term of this patent is extended or adjusted under 35 U.S.C. 154(b) by 69 days.

(21) Appl. No.: 16/068,950

(22) PCT Filed: Jul. 6, 2018

(86) PCT No.: PCT/US2018/040980
§ 371 (c)(1),
(2) Date: Jul. 10, 2018

(87) PCT Pub. No.: WO2019/018137
PCT Pub. Date: Jan. 24, 2019

(65) Prior Publication Data
US 2019/0297838 A1 Oct. 3, 2019

Related U.S. Application Data

(60) Provisional application No. 62/535,028, filed on Jul. 20, 2017.

(51) Int. Cl.
*A01K 29/00* (2006.01)
*A01K 1/035* (2006.01)
(Continued)

(52) U.S. Cl.
CPC ............ *A01K 1/035* (2013.01); *E05B 53/003* (2013.01); *E05C 19/10* (2013.01); *E05F 1/1207* (2013.01); *E06B 7/32* (2013.01); *E05Y 2900/132* (2013.01)

(58) Field of Classification Search
CPC ............ A01K 1/034; A01K 1/035; E06B 7/32
(Continued)

(56) References Cited

U.S. PATENT DOCUMENTS 1,435,782 A    11/1922  Adamson
1,460,945 A     7/1923  Chaplin
(Continued)

FOREIGN PATENT DOCUMENTS

CA       2695253 A1   7/2011
CN       1926300 A    3/2007
(Continued)

OTHER PUBLICATIONS

Written Opinion of the International Searching Authority for PCT/US18/40980 dated Dec. 7, 2018.
(Continued)

*Primary Examiner* — David J Parsley
*Assistant Examiner* — Danielle A Clerkley
(74) *Attorney, Agent, or Firm* — Mark Nowotarski

(57) ABSTRACT

A pet apparatus that facilitates the movement of a household pet through a pet door opening provided in a door at the head of a stairway leading to a lower level of a building. The invention comprises a rigid platform member engaged with a barrier member, and a support member that is attached to the stairway door to safely redirect the pet to travel in a left or right direction, relative to the pet door opening, to prevent the pet from falling down the stairway. A collapsible embodiment of the invention incorporates foldability. Additional embodiments to the collapsible embodiment include manual, cord, and spring-operated foldability. The device is intended for use in combination with commonly available pet doors.

6 Claims, 16 Drawing Sheets

(51) Int. Cl.
*E05B 53/00* (2006.01)
*E05C 19/10* (2006.01)
*E05F 1/12* (2006.01)
*E06B 7/32* (2006.01)

(58) Field of Classification Search
USPC ....... 119/473, 484, 501, 712, 843, 847, 849, 119/908, 28.5; 160/1, 180, 188; 49/169; 108/134, 135
See application file for complete search history.

(56) References Cited

U.S. PATENT DOCUMENTS

| | | | |
|---|---|---|---|
| 1,543,949 A | 6/1925 | Olson | |
| 1,575,241 A | 3/1926 | Williams | |
| 2,498,428 A | 2/1950 | Kruse | |
| 2,499,103 A | 2/1950 | Love | |
| 2,518,588 A | 8/1950 | Allen | |
| 2,579,797 A | 12/1951 | Churchfield et al. | |
| 3,091,221 A | 5/1963 | Worm | |
| 3,173,398 A | 3/1965 | Raymond | |
| 3,391,674 A | 7/1968 | Burleigh | |
| 3,819,216 A | 6/1974 | Richardson | |
| 4,029,048 A | 6/1977 | Gershbein | |
| 4,057,031 A | 11/1977 | Williams et al. | |
| 4,291,645 A | 9/1981 | Crunchelow et al. | |
| 4,445,459 A | 5/1984 | Julie | |
| 4,730,738 A | 3/1988 | Bartus et al. | |
| 4,869,451 A | 9/1989 | Gordon | |
| 4,908,987 A | 3/1990 | Dickson et al. | |
| 5,161,484 A * | 11/1992 | Duane | A01K 1/035 119/28.5 |
| 5,251,572 A * | 10/1993 | Frame | A01K 1/0236 119/417 |
| 5,392,562 A | 2/1995 | Carambula | |
| 5,509,373 A | 4/1996 | Elesh | |
| 5,829,390 A | 11/1998 | Jonilla et al. | |
| 6,253,711 B1 | 7/2001 | Shibles | |
| 6,659,484 B2 | 12/2003 | Knodle et al. | |
| 6,935,647 B2 | 8/2005 | Knodle et al. | |
| 7,025,365 B2 | 4/2006 | Bang et al. | |
| 7,086,352 B2 | 8/2006 | Goodger | |
| 7,204,501 B2 | 4/2007 | Bang et al. | |
| 7,640,890 B1 * | 1/2010 | Maynard | A01K 1/035 119/484 |
| 8,091,513 B1 * | 1/2012 | Garcia | A01K 1/0272 119/28.5 |
| 8,297,235 B2 | 10/2012 | Edgar | |
| 8,468,632 B1 * | 6/2013 | Ricci | A01K 1/035 14/69.5 |
| 9,295,222 B2 | 3/2016 | Martinez | |
| 9,339,006 B1 | 5/2016 | Eby | |
| 10,172,321 B1 * | 1/2019 | Perez | A01K 1/035 |
| 2003/0074841 A1 | 4/2003 | Vesey | |
| 2003/0094485 A1 | 5/2003 | Stapleton, Jr. | |
| 2005/0161000 A1 | 7/2005 | Noyes | |
| 2005/0263091 A1 * | 12/2005 | Knapp | A01K 1/033 119/484 |
| 2007/0163512 A1 | 7/2007 | Di Angelo et al. | |
| 2009/0050072 A1 | 2/2009 | Moser et al. | |
| 2009/0199783 A1 | 8/2009 | Wilmore | |
| 2015/0060205 A1 * | 3/2015 | Blackwell | B60R 3/007 182/223 |
| 2015/0366338 A1 | 12/2015 | Conod | |
| 2016/0050882 A1 | 2/2016 | Longo | |
| 2016/0255802 A1 * | 9/2016 | Jakubowski | A01K 1/035 |
| 2017/0188542 A1 | 7/2017 | Dix | |

FOREIGN PATENT DOCUMENTS

| | | | |
|---|---|---|---|
| CN | 201786217 U | 4/2011 | |
| CN | 205196643 U | 5/2016 | |
| JP | 60-040136 Y2 | 12/1985 | |
| JP | 61-054349 U1 | 4/1986 | |
| JP | 04258489 A * | 9/1992 | A47G 29/20 |
| JP | 2005171746 A | 6/2005 | |
| KR | 200279169 Y1 | 6/2002 | |
| KR | 101577407 B1 | 12/2015 | |

OTHER PUBLICATIONS

US International Search Report for PCT/US18/40980 dated Dec. 7, 2018.
Securiton Model Z-32, Z-62, Z-82 Bracket Installation Instructions, pp. 1 and 2, Rev. D, 6/09.
English translation of KR 101577407 B1 by You Hee Jong dated Dec. 14, 2015.
English translation of KR 200279169 Y1 by Kim Yong Hee dated Jun. 22, 2002.
People's Rebpublic of China ePCT Office action, PCT Collaborative Search and Examination Pilot, Upload peer contribution for IA No. US2018040980 uploaded Sep. 25, 2018.
English translation of CN 205196643 U by Hu Hua dated May 4, 2016.
English translation of CN 1926300 A by Crosby Noyes dated Mar. 7, 2007.
European Patent Office ePCT Office action, PCT Collaborative Search and Examination Pilot, Upload peer contribution for IA No. US2018040980 uploaded Sep. 27, 2018.
Japan Patent Office ePCT Office action, PCT Collaborative Search and Examination Pilot, Upload peer contribution for IA No. US2018040980 dated Sep. 17, 2018.
English translation of JP 61-054349 U1 by Junichi Hibino dated Apr. 12, 1986.
English translation of JP 60-040136 Y2 by Tokai Giken dated Dec. 2, 1985.
Korean Intellecutal Property Office ePCT Office action, PCT Collaborative Search and Examination Pilot, Upload peer contribution for IA No. US2018040980 dated Sep. 21, 2018.
English translation of JP 2005171746 A by Daiso K.K dated Jun. 30, 2005.
English translation of CN 201786217 U by Zhang Yongxin dated Apr. 6, 2011.
Securitron ISO 9001; Securitron Specification Z Bracket for Armature Mounting (Inswing Doors and Gates) Project Data Sheet Product Name Z-32, Z-34, Z-62, Z-82 Bracket; Rev Dec. 10, 2001.
Securitron Assa Abloy, 2010 Product Catalog, Your Single Source for Access Control Accessories, See p. 17, 910-10190 Rev.
Heininger Holdings, LLC, PortablePet™, Twistep® for Pick-Up Trucks 3045, last viewed Jun. 11, 2019.

* cited by examiner

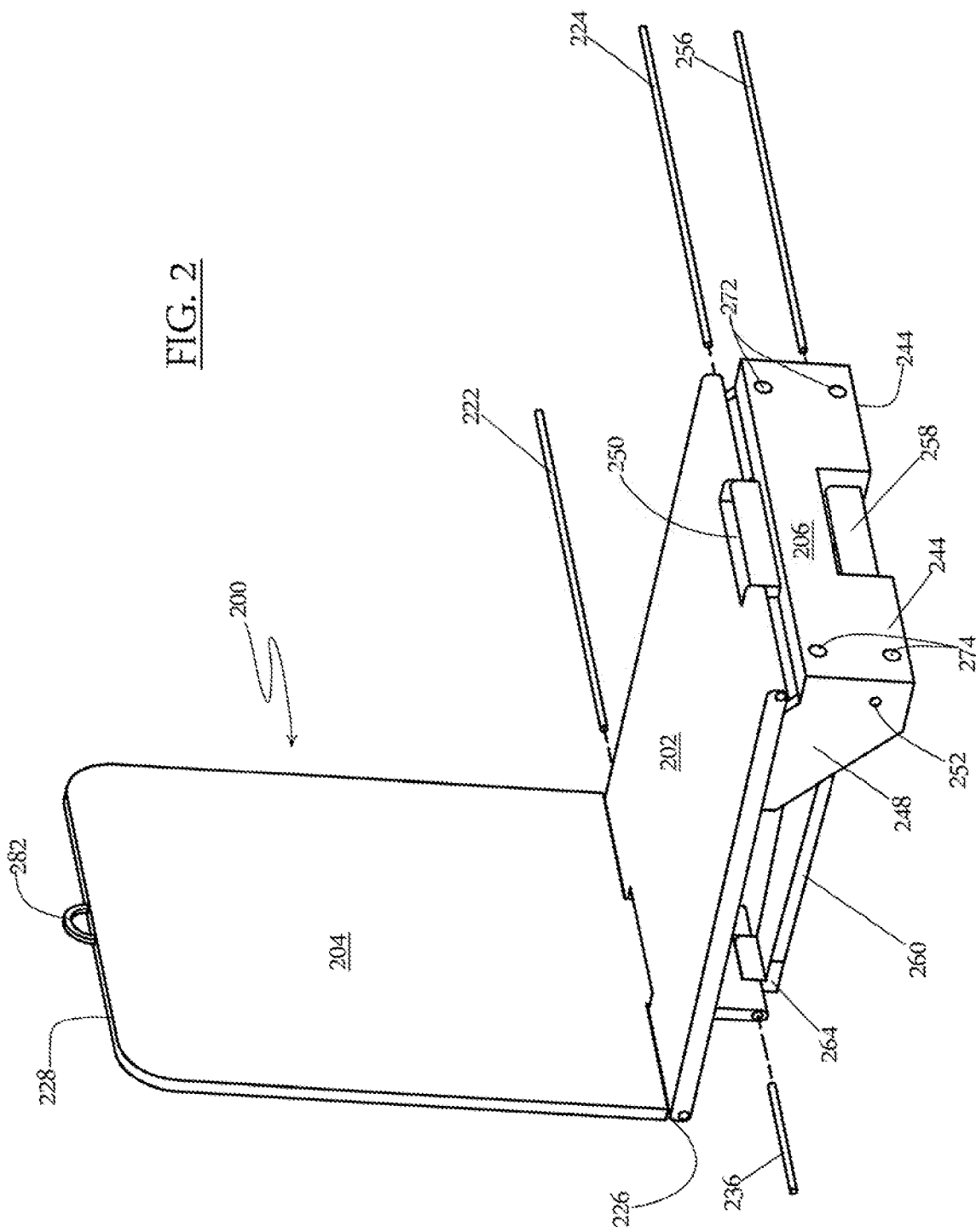

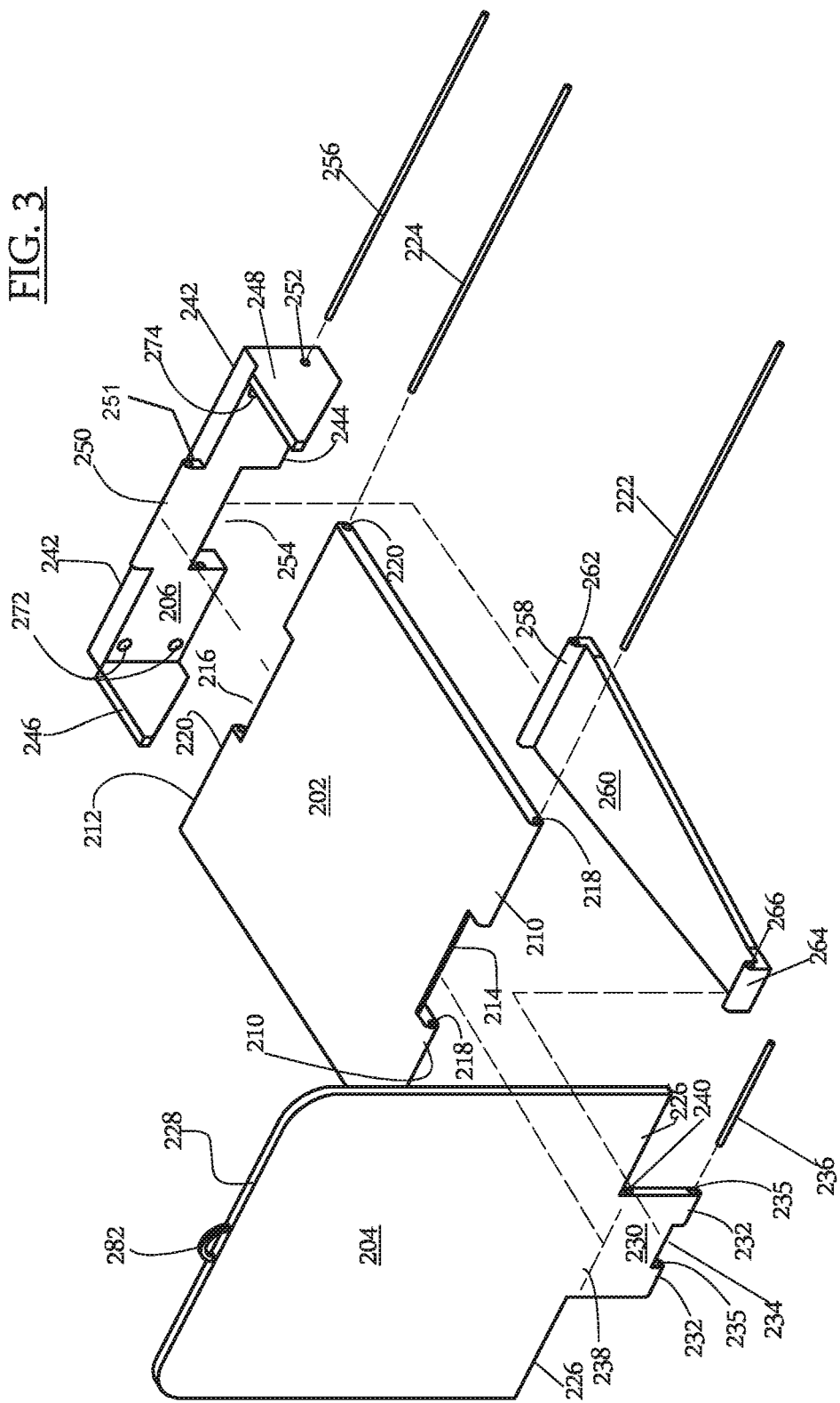

PET GUIDE PLATFORM FOR A PET DOOR OPENING

FIELD OF THE INVENTION

The present invention relates to an apparatus intended to improve independent mobility and safe passage of household pets through stairway doors within a home or other building.

BACKGROUND OF THE INVENTION

In homes or buildings that house household pets, such as cats and dogs, a pet door opening is generally provided in a door that leads to a lower level or basement. Basements are typically an area in a home where pet needs and provisions, such as feed, water, waste management and bedding, are kept to accommodate such pets due to odor, space shortage or other inconveniences that would be present if such items would be contained in the living areas of the home. The general purpose of the pet door opening in a door leading to a lower level or basement, therefore, is to accommodate the pet in having free access to their litter boxes or containers to allow them to relieve themselves or to eat and sleep.

However, in their travel to the lower level of the household, such as a basement, the pets must enter and exit the pet door opening in the stairway door wherein they immediately encounter the first step of the stairway leading to the lower level. Typically, their momentum going through the pet door opening will carry them onto the first and second steps much too quickly. Due to the poor ergonomic configurations in approaching the first and second steps, however, the risk of a fall down the stairs leading to pet injuries is substantially increased. What is needed then is a device or apparatus that will provide improved ergonomic pet access to the stairs. This risk can be minimized by offering them a safe passage down the stairway, and more specifically, by providing a device or apparatus that will safely direct their path of travel and slow down their momentum when entering the stairway from the pet door opening. Such an apparatus will offer them a footstep platform upon which to pause after passing through a pet door opening at the top of a stairway.

It is therefore an object of the present invention to provide a stairway pet apparatus for a household pet that will lower the risk of injury to the pet when it is traveling from a pet door opening down the stairway to a lower level of the household. Another object of the invention is to provide a stairway pet apparatus that is simple in operation and that can attach itself to the back side of the door that leads to the lower level stairway of the household or building. And yet another object of the disclosure herein is to provide a stairway pet apparatus that can be folded and/or collapsed to mitigate and/or avoid the situation where the stairway pet apparatus itself can become an obstacle by limiting human access or preventing the full opening or functioning of the stairway door.

DESCRIPTION OF THE PRIOR ART

The prior art discloses a variety of devices to facilitate movement of pets through a pet door portal within a household, for example, U.S. Pat. No. 6,253,711 B1, U.S. Patent Application Publication 2005/0161000 A1, and U.S. Pat. No. 4,908,987. It is believed that nothing, however, is provided in those disclosures concerning the specific need to re-direct the direction of travel of a pet transiting through a pet door opening which is exposed to a stairway leading to a lower floor of a household, or a structure for overcoming the same.

SUMMARY OF THE INVENTION

A stairway pet apparatus is disclosed for preventing a household pet from traveling down a stairway in a straight and downward directional movement leading from a pet door opening in a stairway door that faces the stairway. In its briefest form, the stairway pet apparatus comprises (i) a horizontally disposed rigid platform member having opposite first and second edges; (ii) a substantially, vertically disposed rigid barrier member comprising opposite lower and upper edges; (iii) a vertically disposed support member that comprises upper and lower edges whose upper edge is connected about the second edge of the rigid platform member to facilitate its support; and (iv) a securement member for detachable fixed engagement of the support member of the apparatus with the stairway door at a position in which the horizontal alignment of the rigid platform member is below or substantially equal with a lower edge of the pet door opening.

The purpose of the rigid platform member is to provide a perch upon which the pet can step onto after exiting the pet door opening. The function of the barrier member is to re-direct the path of movement for the pet away from a straight directional movement down the stairway to avoid injury to the pet. The support and securement members facilitate the detachable securement of the stairway pet apparatus to the rear of the door containing the pet door opening while securely maintaining the apparatus in place with the stairway door. The barrier member, rigid platform member and support member are preferably of an integral construction.

The securement member optionally includes a securement means for detachable fixed engagement of the support member with the stairway door. The securement means preferably includes (i) a placement member in detachable, fixed disposition on the opposite side of the stairway door, for engaging and detachably securing the support member to the stairway door, and (ii) at least two nuts and bolts for passage of the bolts through corresponding openings provided in the support member and placement member.

In another embodiment, a collapsible stairway pet apparatus is provided for preventing a household pet from traveling in a straight and downward directional movement along a stairway leading from a pet door opening in a stairway door that faces the stairway, comprising (i) a horizontally disposed rigid platform member comprising opposing first and second sides, the first side being provided with at least one first hinge and the second side being provided with at least one second hinge; (ii) a substantially, vertically disposed rigid barrier member comprising opposing lower and upper sides, the lower side of the barrier member being fixed with the first hinge of the first side of the rigid platform member for rotation of the barrier member about the first side of the rigid platform member; (iii) a vertically disposed support member that is detachably fixed with the stairway door. The support member comprises opposing upper and lower sides, the upper side of which is connected with the second hinge of the rigid platform member to enable upward rotation of the rigid platform member about the upper side of the support member; (iv) a vertically extending protrusion provided about the lower side of the barrier member for accommodating the receipt and engagement of at least one third hinge; (v) at least one fourth hinge provided about the lower side of the support member; (vi) a rigid, longitudinally extending, connecting link that has first and second end portions, the first end portion being engaged with the third hinge, and the second end portion being engaged with the fourth hinge. Both of these engagements facilitate the rotational movement of the barrier member and rigid platform member about their respective first and second hinges. The rotation enables the rigid platform member to traverse between a substantially horizontal deployed position and a substantially vertical, collapsed position adjacent to the back side of the stairway door. And (vii) at least one rest member secured to the support member and which is capable of maintaining the rigid platform member in a substantially horizontal position when the stairway pet apparatus is in its horizontally deployed position.

The collapsible stairway pet apparatus optionally includes a locking member that is secured to the back side of the stairway door, i.e., the side of the door facing the stairway, for maintaining the pet apparatus in its substantially vertical, collapsed position relative to the stairway door. In a preferred embodiment, the locking member comprises a hook secured to the back side of the stairway door and a ring secured about the upper side of the barrier member for engagement of the ring with the hook.

As another optional embodiment, the collapsible pet apparatus can additionally include a securement member for detachable fixed engagement of the support member with the stairway door at a position in which the horizontal alignment of the rigid platform member is below or substantially equal with a lower edge of the pet door opening. The securement member is configured for disposition on the front side of the stairway door for detachable fixed engagement with the support member. The securement member is detachably engaged with the support member, preferably by means of at least two nuts and bolts for passage of the bolts through corresponding openings provided in the support member, the stairway door and the securement member. In keeping with this arrangement, the hook of the locking member can alternatively be fixed with the securement member on the front side of the stairway door in which the ring is detachably engaged with the hook by means of a cord that is configured to pass through an opening provided in the stairway door above the pet door opening. With this option, the collapsible stairway pet apparatus can be manually operated from the front side of the stairway door between a deployed position and a collapsed position by lowering and raising the pet apparatus with the appropriate use of the cord. In this manner, the stairway door need not be opened to operate the collapsible pet apparatus.

For an automatic operation of the collapsible stairway pet apparatus between a deployed position and a collapsed position, the pet apparatus can optionally and additionally include a torsional spring connected to the first side edge of the barrier member and the lower side of the platform member such that a bias exists for the rotational movement of the platform and barrier members about the first hinge to a substantially parallel position or collapsed position relative to the stairway door. A fastener is also included which is secured to one of two or more rest members. The fastener comprises (i) a releasable spring-loaded clamp detachably communicating with the platform member for maintaining the platform member in a substantially horizontal position, and (ii) a release member for decoupling the clamp from the platform member to allow the rotation of the platform member and barrier member to the collapsed, substantially vertical position adjacent to the stairway door. By exercising operation of the release member which holds the rigid platform member in its deployed position, automatic collapse of the collapsible stairway pet apparatus to a collapsed position from its deployed position is accomplished by virtue of the bias of the torsional springs acting on the rigid platform member to propel it and the barrier member in the upward, vertical direction.

A foldable and collapsible stairway pet apparatus is also disclosed for preventing a household pet from traveling in a straight and downward directional movement along a stairway leading from a pet door opening in a stairway door that faces the stairway. This version of the stairway pet apparatus comprises (a) a rigid platform member having a planar configuration that includes opposing first and second sides. The first side of the rigid platform member is provided with a first hinge and its second side is provided with a second hinge. The platform further comprises at least two side members underlying and depending from the rigid platform member for its support, with each side member having a defined front end and rear end. The foldable and collapsible pet apparatus also includes (b) a rigid barrier member having a top and bottom surface, and an upper and lower side. The bottom surface of the barrier member is connected to and engaged with the first hinge of the rigid platform member which is disposed about the bottom side of the barrier member. A downwardly extending flange from the bottom side of the barrier member is provided, the lower portion of the flange being configured to rest against the front ends of the side members of the rigid platform member when the barrier member is rotated about the first hinge to a deployed upright position relative to the rigid platform member. The flange and barrier member are preferably of an integral construction; and (c) a support member comprising opposing front and back sides, said front side being connected to the second hinge of the rigid platform member for rotational movement of the platform member about the second hinge in an upward direction relative to the stairway door. The support member is configured for receiving the rear ends of the rest members for maintaining the platform member in a horizontal position for being substantially perpendicular to the stairway door. The back side of the support member is configured for detachable, fixed engagement with the stairway door. The length of the barrier member is less than the length of the rigid platform member in order to accommodate the rotation of the bottom surface of the barrier member onto the top surface of the rigid platform member and for defining a folded state, and for accommodating the upward rotational movement of both the barrier member and rigid platform member in their folded state about the second hinge to a collapsed state relative to the stairway door.

The flange of the barrier member and front ends of the rest members are configured for maintaining the barrier member at an obtuse angle relative to the top surface of the rigid platform member when in its deployed position. The obtuse angle is preferably from about 100 to about 120 degrees.

The foldable and collapsible pet apparatus optionally comprises an attachment mechanism disposed on the back side of the stairway door to maintain the apparatus in its collapsed state. The attachment mechanism preferably comprises a hook secured to the back side of the stairway door and a ring secured about the upper side of the barrier member for engagement of the ring with the hook.

Other and further objects and advantages will become apparent from the disclosures in the following specification and accompanying drawings.

BRIEF DESCRIPTION OF THE DRAWINGS

Further features and advantages of the invention will become apparent from reading the following detailed description in conjunction with the following drawings, in which like reference numbers refer to like parts:

FIG. 2 is an isolated isometric perspective view of a stairway pet apparatus in accordance with a second embodiment of the invention.

FIG. 3 is a fully exploded isometric perspective view of the stairway pet apparatus illustrated in FIG. 2.

DETAILED DESCRIPTION

The examples and the referenced drawings in this detailed description are merely exemplary, and should not be used to limit the scope of the claims in any claim construction or interpretation.

In its briefest form, the stairway pet apparatus comprises a platform member, barrier member and support member collectively configured for fixed detachable securement to rear side of a stairway door containing a pet door opening to provide a safe travel for a household pet down a stairway in a household or building by directing the pet in a left or right direction after exiting the pet door opening. The barrier member of the apparatus forces the pet to take an intermediate step onto the first step of the stairway immediately below the platform member, thereby shortening the greater vertical height the pet would have to overcome when exiting the pet door opening without the pet apparatus in place.

When the pet ascends the stairway, the apparatus provides an ergonomically beneficial step and perching position for reentry through the pet door opening. This avoids potential harm or injury to the pet when it travels up or down a stairway to or from a lower level of the building, or to divert from other hazard.

Figure 1:
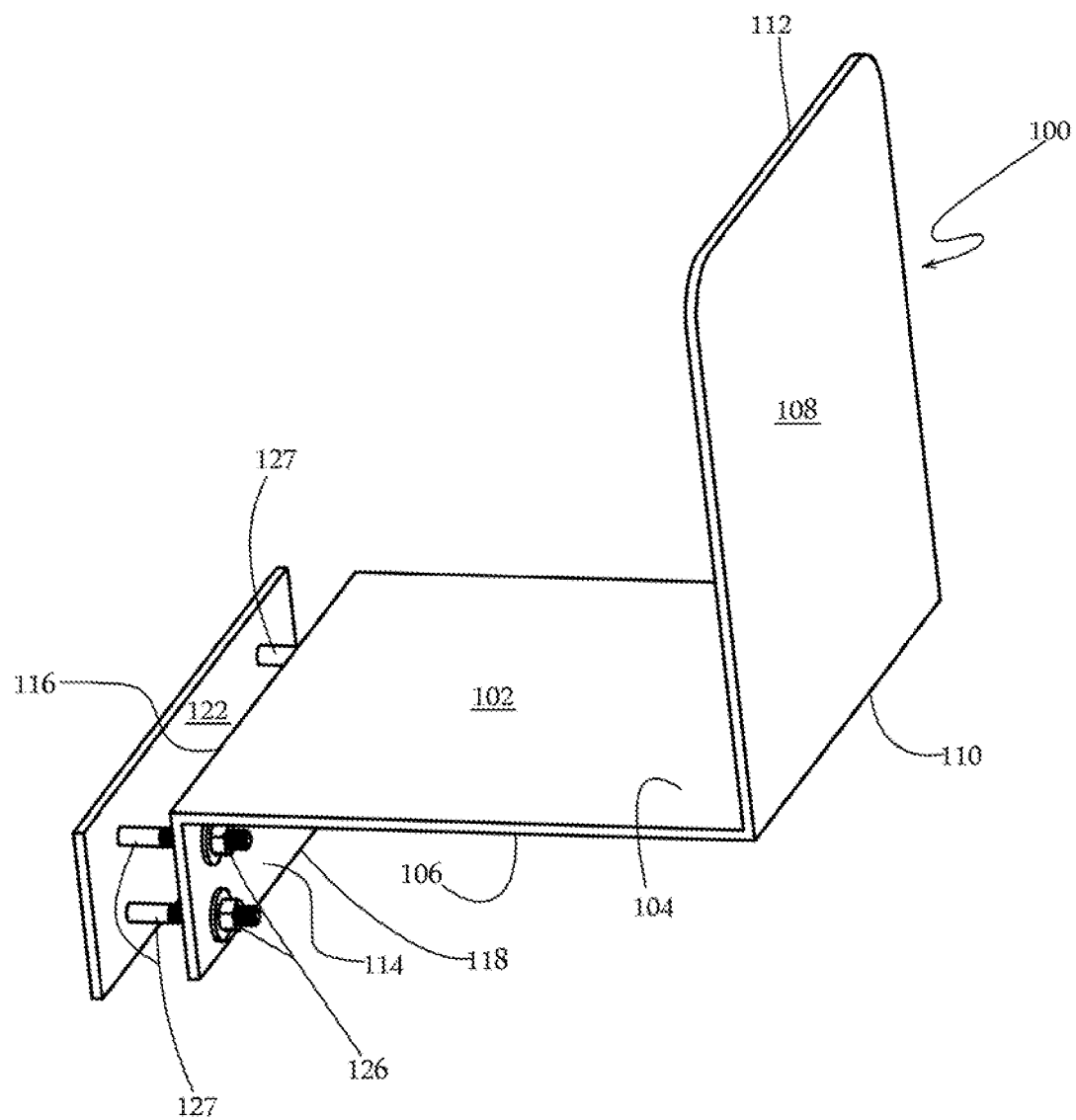
FIG. 1 is an isolated isometric perspective view of a stairway pet apparatus in accordance with a first embodiment of the invention.

A first embodiment of the pet apparatus is illustrated in FIG. 1 which shows a stairway pet apparatus 100 with a horizontally disposed rigid, planar platform member 102 having a top surface 104 defining a first side and a bottom surface 106 defining a second side. Vertically aligned barrier member 108 also has a rigid construction having an inner surface 110, and an outer surface 112, each respectively opposing the other. In accordance with the first embodiment, barrier member 108 is rigidly engaged with platform member 102 which in turn is rigidly engaged with support member 114. Support member 114 is vertically oriented and has an upper edge 116 defining an upper side, and a lower edge 118 defining a lower side, each respectively opposing the other. The upper edge 116 of the support member 114 is fixedly engaged with the bottom surface 106 of platform member 102 to provide support thereto. In the illustration shown in FIG. 1, platform member 102 is substantially horizontal when deployed. Barrier member 108 has a vertical orientation relative to platform member 102 and is shown to be at a substantially right angle to the platform. It will be understood, however, that angle of barrier member 108 with platform member 102 can be at an obtuse angle so long as the barrier member accomplishes its function of causing the pet to be directed to the left or right of the stairway pet apparatus.

Platform member 102, barrier member 108 and support member 114 can be of any rigid construction, such as a hardened or rigid plastic, e.g., polyethylene, or metal, wood or similar construction. Each of these components can be constructed of the same or different rigid materials. As a preference, platform member 102, barrier member 108, and support member 114 are of a unitary construction. These three components can also be made as separate parts and subsequently assembled to each other.

It is to be understood that platform member 102 be of sufficient strength and structural rigidity to support its own weight and that of barrier member 108 in addition to the full weight of the passing pet without temporary or permanent deflection or deformation of the platform member. It is therefore critical that platform member 102, together with the rest of the apparatus components, including those of subsequent embodiments disclosed herein, be capable of supporting a given pet's weight without undesired flexure which could disturb the balance of the pet while it is stationary with or moving relative to platform member 102.

Figure 1A:
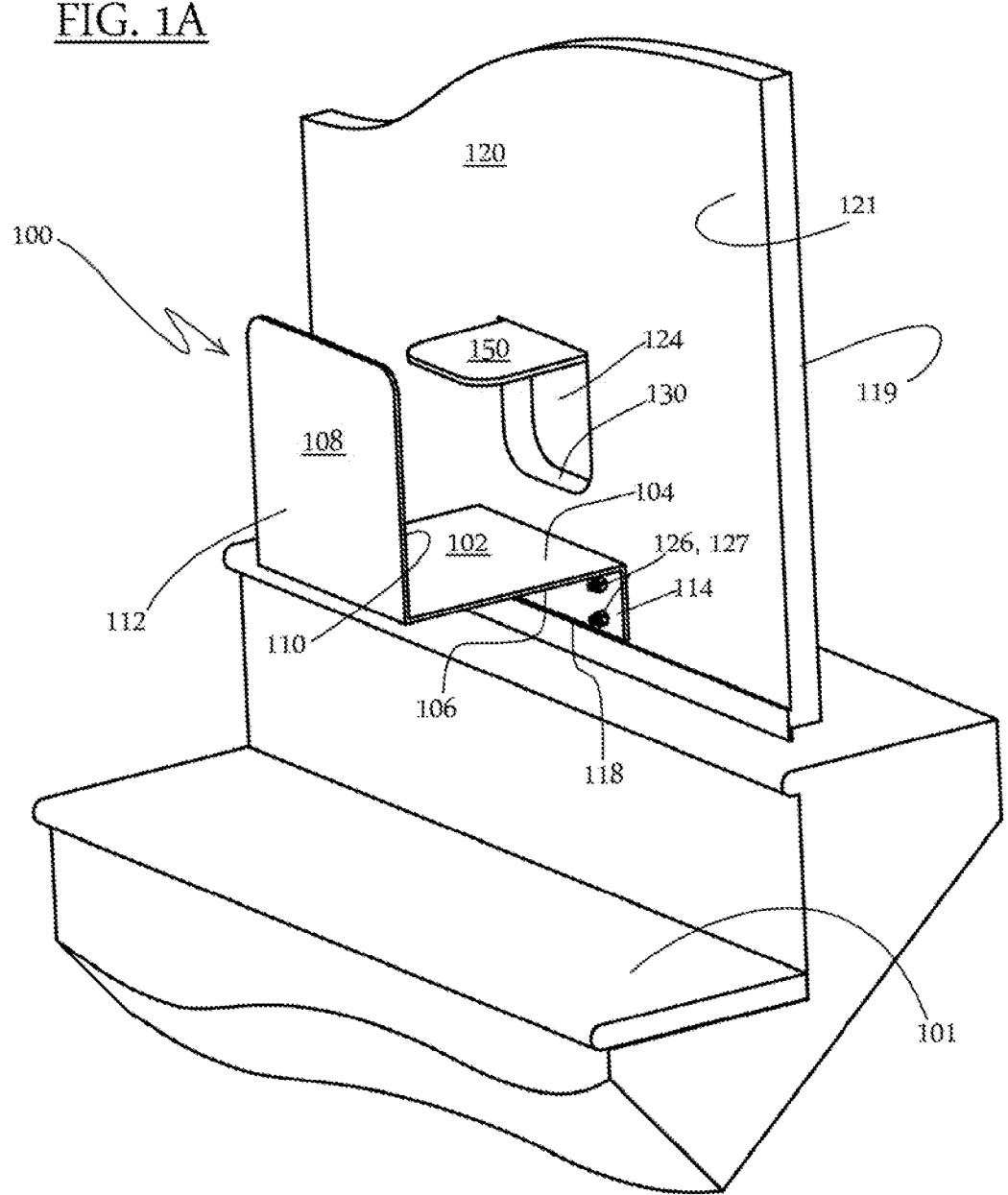
FIG. 1A is an isometric perspective view of the first embodiment illustrated in FIG. 1 showing its attachment to the backside of a stairway door with a pet door opening.

Referring once again to FIG. 1 and also FIG. 1A, securement and reinforcement of the stairway pet apparatus 100 to stairway door 120 is accomplished with a securement means in the form of a rigid placement member 122 which is provided on upstairs side 119 of stairway door 120. Placement member 122 is in detachable fixed engagement with support member 114 by means of a plurality of nuts and bolts 126, 127, in this case four, passing through corresponding openings 128, 129 provided in support member 114, stairway door 120, and placement member 122. Securement of the stairway pet apparatus with door 120 can be accomplished by any conventional means, and in this case, may be accomplished by attaching bolts 126, 127 directly to the door without the use of placement member 122, e.g., using screws (not illustrated) taking the place of nuts and bolts 126, 127. In each case, however, securement of the stairway pet apparatus to stairway door 120 takes place such that horizontally disposed platform member 102 is positioned at a point below or equal to the bottom 130 of pet door opening 124 to facilitate the pet's passage therethrough and onto platform member 102.

It is common in most households that a door leading to a lower level, such as a basement, will open into a room or corridor on the same level as the door, as opposed to opening directly into the stairway. For this common practice, the stairway pet apparatus, according to the invention herein, is designed for attachment to the downstairs side 121 of stairway door 120. It is therefore desirable that the pet stairway apparatus not impede the flow of traffic that might take place through stairway door 120. In accordance with a second embodiment of the invention, then, a stairway pet apparatus is provided by configuring it such that it can be vertically folded or collapsed against the back of stairway door 120 when the apparatus is not in use. Otherwise, to leave it deployed in the position shown in FIG. 2 will cause the door to not fully open into the stairway thereby preventing full egress through the door opening down the stairs and ultimately to the lower level of the household or building.

Figure 2A:
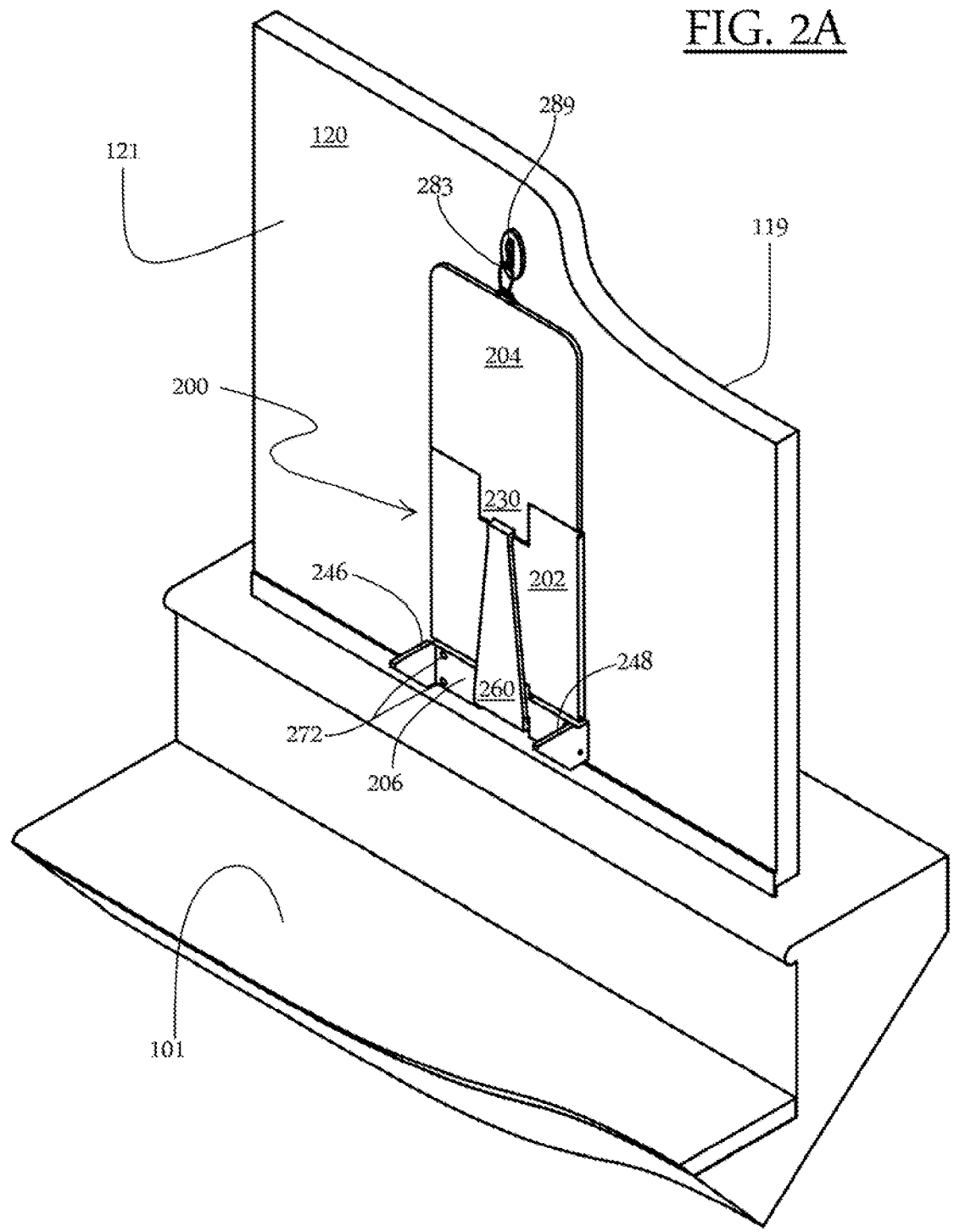
FIG. 2A is an isometric perspective view of the stairway pet apparatus illustrated in FIG. 2 collapsed position and attached to the rear side of the stairway door in accordance with the second embodiment of the invention.

Referring to FIGS. 2, 2A and 3, a collapsible stairway pet apparatus 200 is illustrated comprising a platform member 202, barrier member 204, and support member 206. The collapsible stairway pet apparatus 200 illustrated in FIG. 2 shows the apparatus in its deployed state, i.e., where platform member 202 is substantially horizontal and substantially perpendicular to support member 206 and door 120, and barrier member 204 is in a vertical position relative to platform member 202, preferably at a substantially right angle. Platform member 202 has a front side 210 and a rear side 212, each of which has a recess 214, 216 respectively positioned about a mid-portion of their respective sides. Positioned within the front and rear sides 210, 212 of platform member 202 are front and rear longitudinal hollow openings 218 and 220 for accommodating receipt of front and rear hinge pins 222, 224, respectively.

Barrier member 204 has a rigid generally square or rectangular configuration having a lower side 226 and an upper side 228. Extending from the approximate mid-portion of lower side 226 is a generally rectangular flange 230 whose lower sides 232 have a flange recess 234. Lower sides 232 have hollow openings 235 therein for receiving hinge pin 236. The opposing upper portion 238 of flange 230 contains a longitudinal hollow opening 240 for receiving front hinge pin 222 of platform 202. Flange 230 is fitted within front recess 214 such that hinge pin 222 passes through opening 240 and front hollow openings 218. Front hinge pin 222, opening 240, front recess 214, and front hollow openings 218 therefore combine to form a hinge for engaging and rotating barrier member 204 relative to platform member 202.

Figure 4:
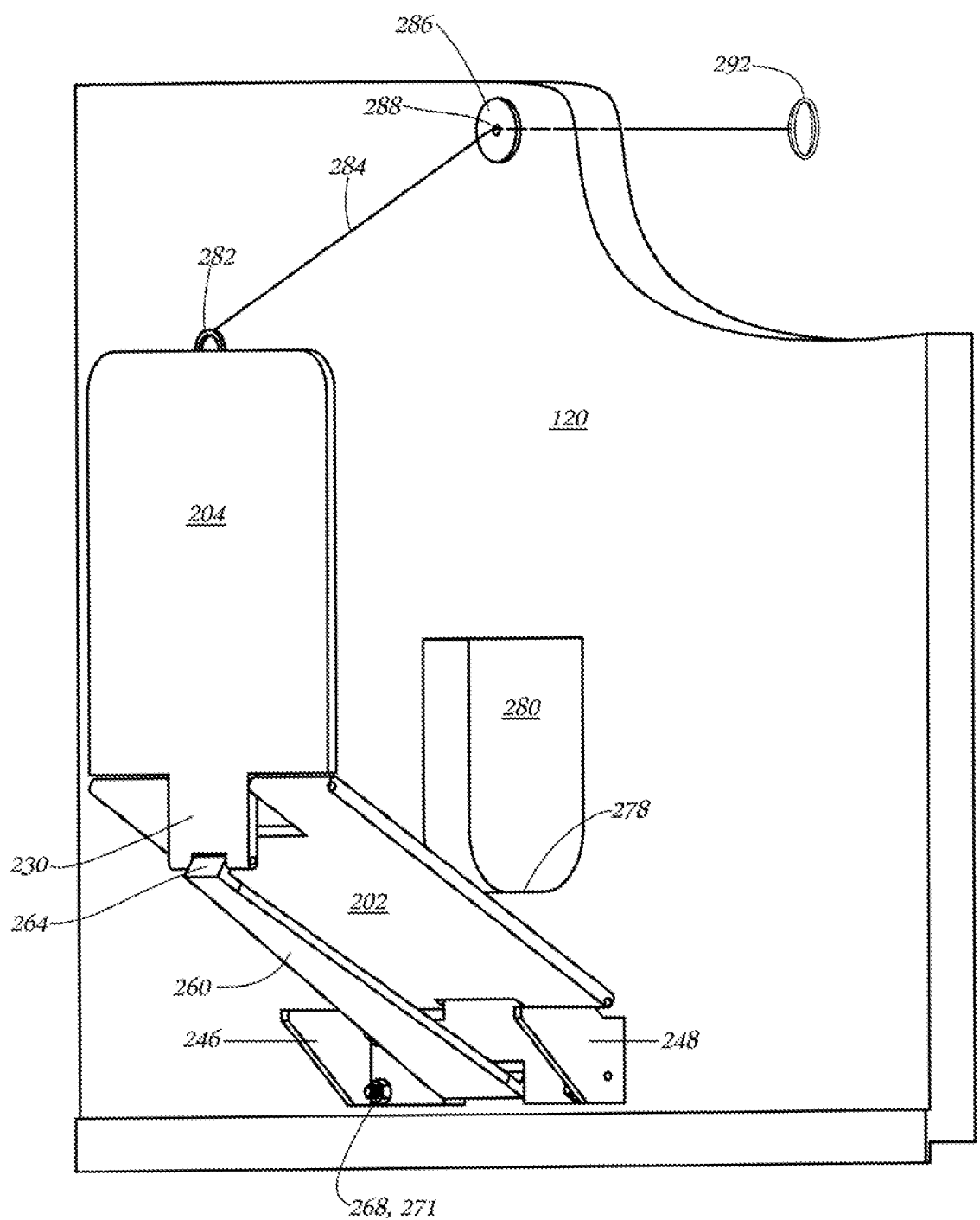
FIG. 4 is an isometric perspective view of the stairway pet apparatus illustrated in FIG. 2 showing its attachment, in a partially deployed position, to the backside of a stairway door with a pet door opening in accordance with a third embodiment of the invention.

Referring once again to FIGS. 2 and 3, as well as FIG. 4, collapsible stairway pet apparatus 200 also includes a vertically disposed support member 206 for detachable fixed securement to the upstairs side 119 of stairway door 120. Support member 206 comprises opposing upper and lower sides 242, 244. Side support members 246, 248 serving as rest members are also included, and are preferably made integrative with support member 206 as a unitary construction (see FIG. 15), for supporting platform member 202 when stairway pet apparatus 200 is in a deployed position relative to stairway door 120. At least one side of support member is utilized for maintaining the support of platform member 202. Upper side 242 of support member 206 is provided with an upwardly extending flange 250 configured for insertion into rear recess 216 of rear side 212 of platform member 202. Flange 250 has a longitudinal hollow opening 251 for receiving rear hinge pin 224 to provide a hinge assembly for allowing platform member 202 to rotate in an upward direction relative to support member 206.

Lower sides 244 of support member 206 contain a longitudinal hollow opening 252 for receiving hinge pin 256 whose length passes through lower side recess 254. Lower side recess 254 is configured to receive the rear portion 258 of a rigid, longitudinally extending, connecting link 260. Rear portion 258 also contains a longitudinal hollow opening 262 which, after its insertion into lower side recess 254, is in alignment with longitudinal hollow openings 252 for receiving hinge pin 256 thereby engaging connecting link 260 with support member 206.

The front portion 264 of rigid connecting link 260 also contains a longitudinal hollow opening 266, which, after its insertion into the recess 234 of flange 230, aligns with hollow openings 235 of lower sides 232 such that hinge pin 236 is received therethrough. In the foregoing manner, the free rotational movement of barrier member 204 and rigid platform member 202 about their respective hinge pins 222 and 236 is facilitated. In similar fashion, the rotational movement of platform member 202 relative to support member 206 about their respective hinge pins 224 and 256 to either a substantially horizontal deployed position (see FIG. 5), or a substantially vertical collapsed position relative to stairway door 120, is also facilitated.

Figure 5:
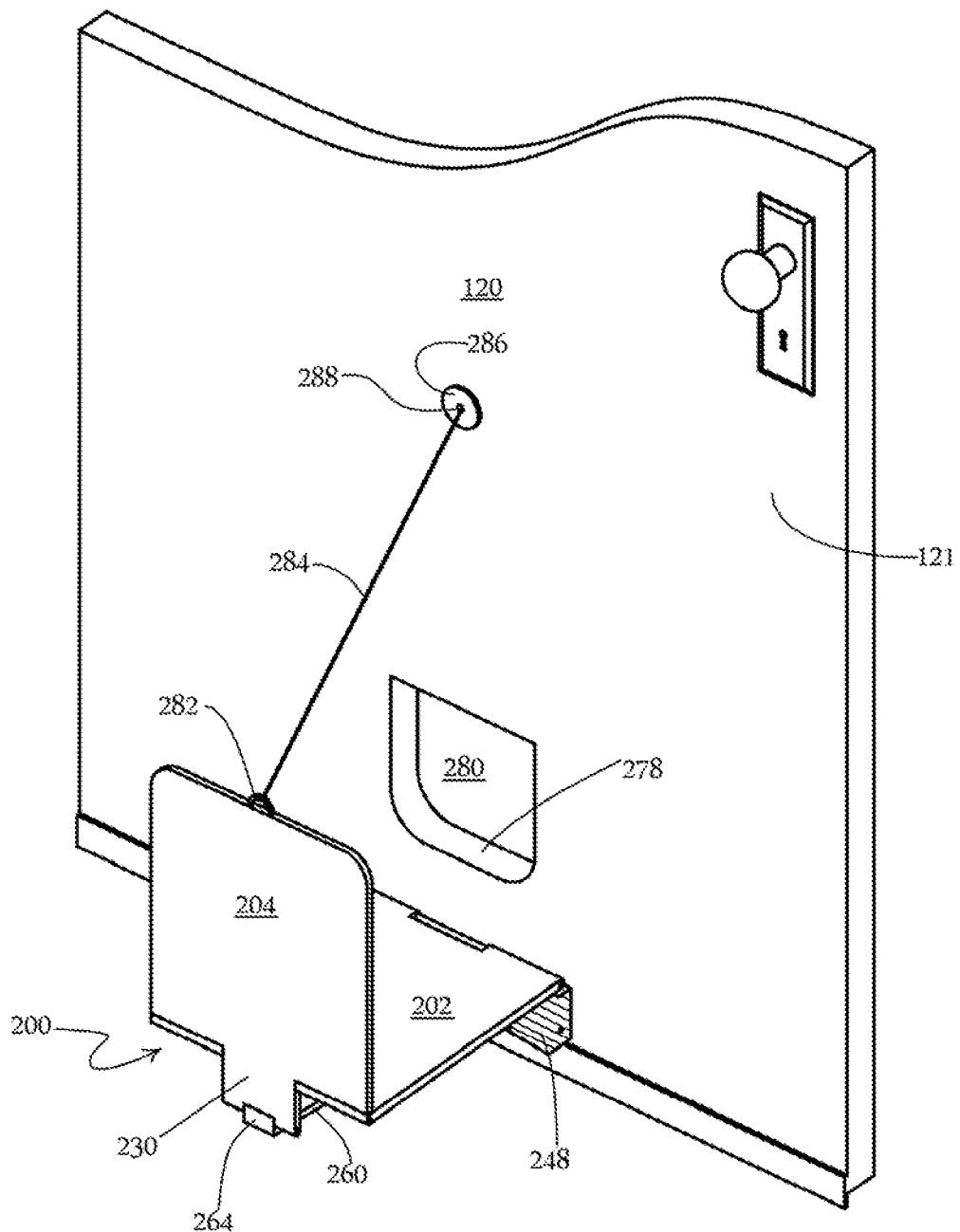
FIG. 5 is an isolated perspective view of the stairway pet apparatus illustrated in FIG. 4 illustrating the apparatus in a fully deployed position.
Figure 6:
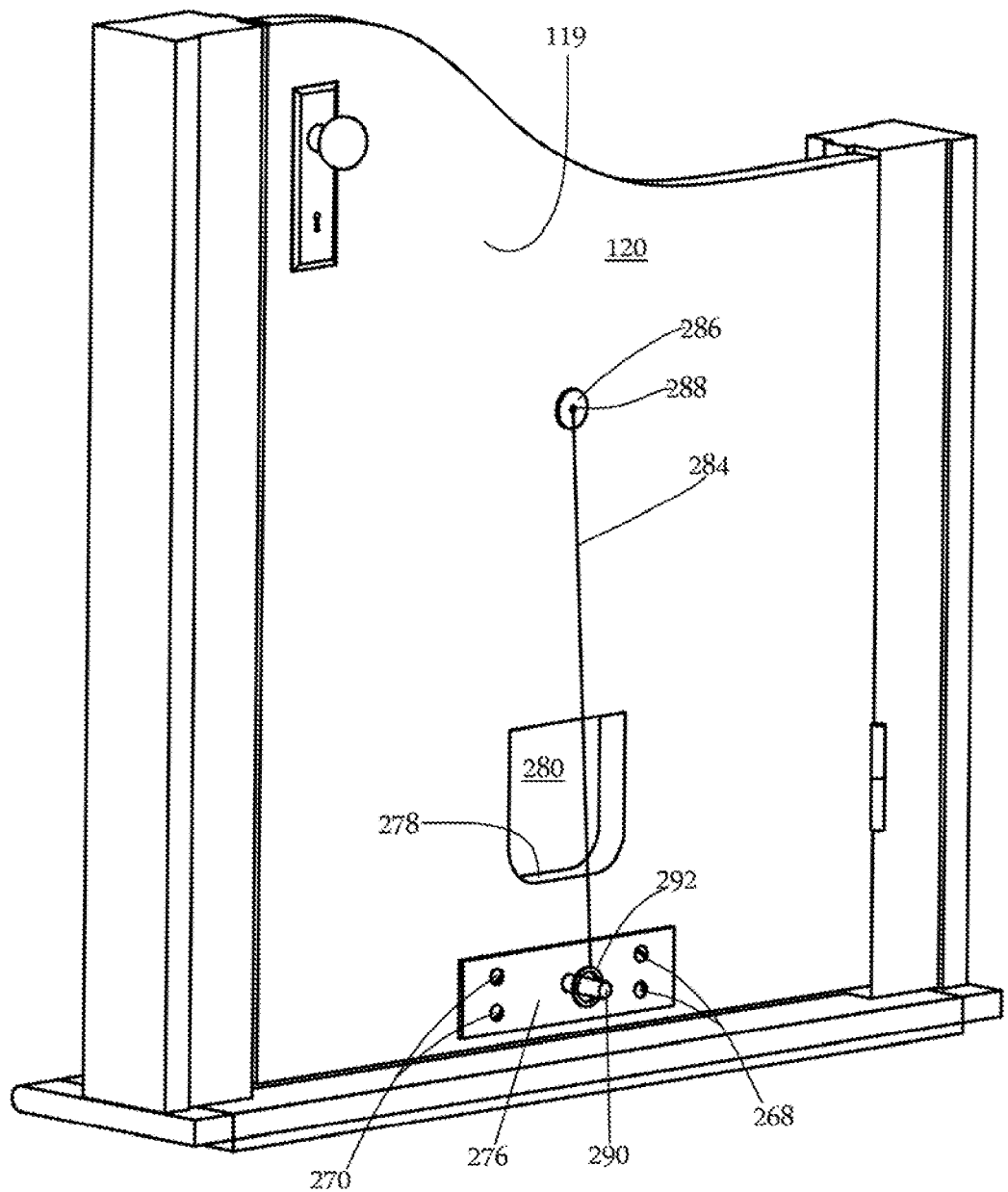
FIG. 6 is an isometric perspective view of the front side of the doorway illustrated in FIG. 5 showing the manner of maintaining the doorway pet apparatus in a collapsed position in accordance with the third embodiment of the invention.

The attachment and securement of the collapsible stairway pet apparatus 200 to doorway 120 is best illustrated in FIGS. 4, 5 and 6. Support member 206 is detachably fixed to the upstairs side 119 of stairway door 120 by any conventional means. In this embodiment, the attachment and securement is obtained by the use of bolts 268, 270 passing through respective openings 272, 274 provided in support member 206, stairway door 120, and securement member 276 (FIG. 5). Securement is finalized using wing nuts or hex nuts 271 threaded and tightened onto bolts 268, 270. In accordance with this second embodiment, support member 206 and securement member 276 are secured with door 120 such that the horizontal alignment of rigid platform member 202 is below or substantially equal with the lower edge 278 of pet door opening 280 when the collapsible stairway pet apparatus 200 is in its deployed position. In this manner, the pet will have an immediate and safe platform to enter upon once it passes through pet door opening 280.

As shown in FIGS. 2 and 4, the second embodiment of the stairway pet apparatus 200 is configured to be manually operated from a deployed position, wherein platform member 204 is supported in an extended, substantially horizontal, perpendicular relationship with stairway door 120 (FIG. 2) when in use, and a collapsed position wherein the connecting link 260, via its connection with support member 206 and platform 202, transfers motion to the interconnected hinge assembly and enables the pet apparatus to be collapsed against stairway door 120 (see FIG. 2A). Collapsing the apparatus against the downstairs side 121 of stairway door 120 therefore mitigates and/or removes any obstruction to the opening of stairway door 120 by substantially eliminating the apparatus from the stairway path.

Figure 7:
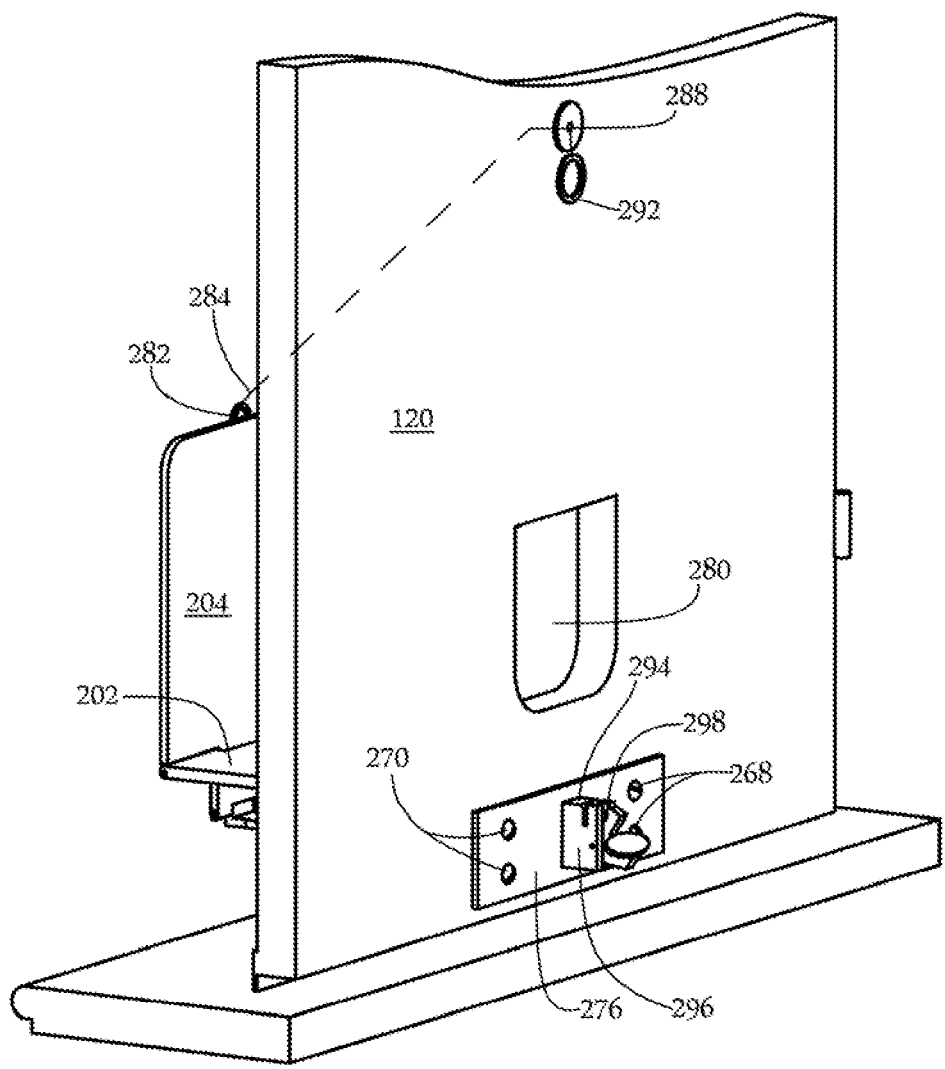
FIG. 7 is an isometric perspective view of the stairway pet apparatus in its deployed position in accordance with a second and third embodiments of the invention, as perspectively viewed from the front side of the stairway door.
Figure 8:
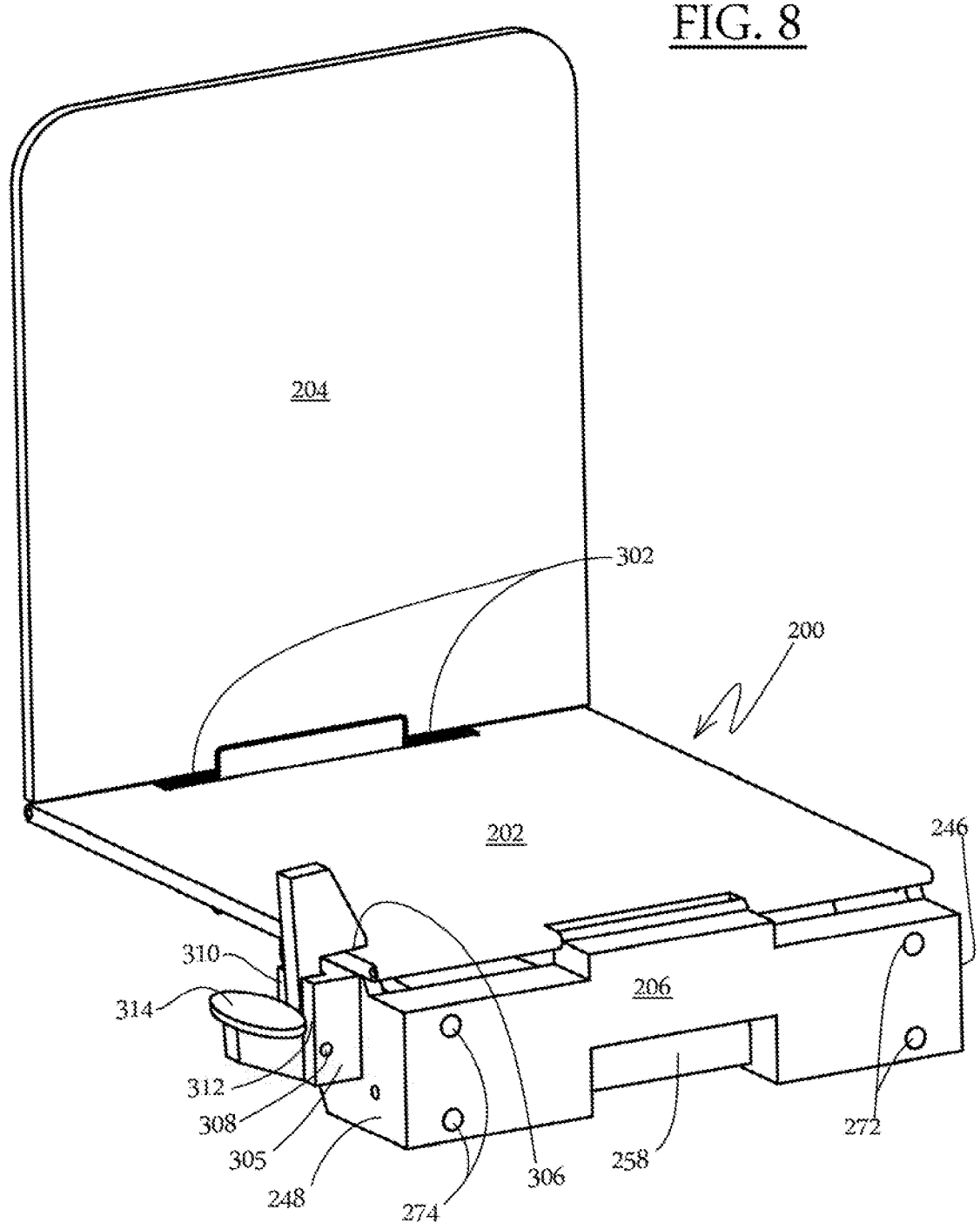
FIG. 8 is an isometric perspective view of the stairway pet apparatus of FIG. 7 maintained in its deployed position without attachment to the stairway door, in accordance with a fourth embodiment of the invention.
Figure 9:
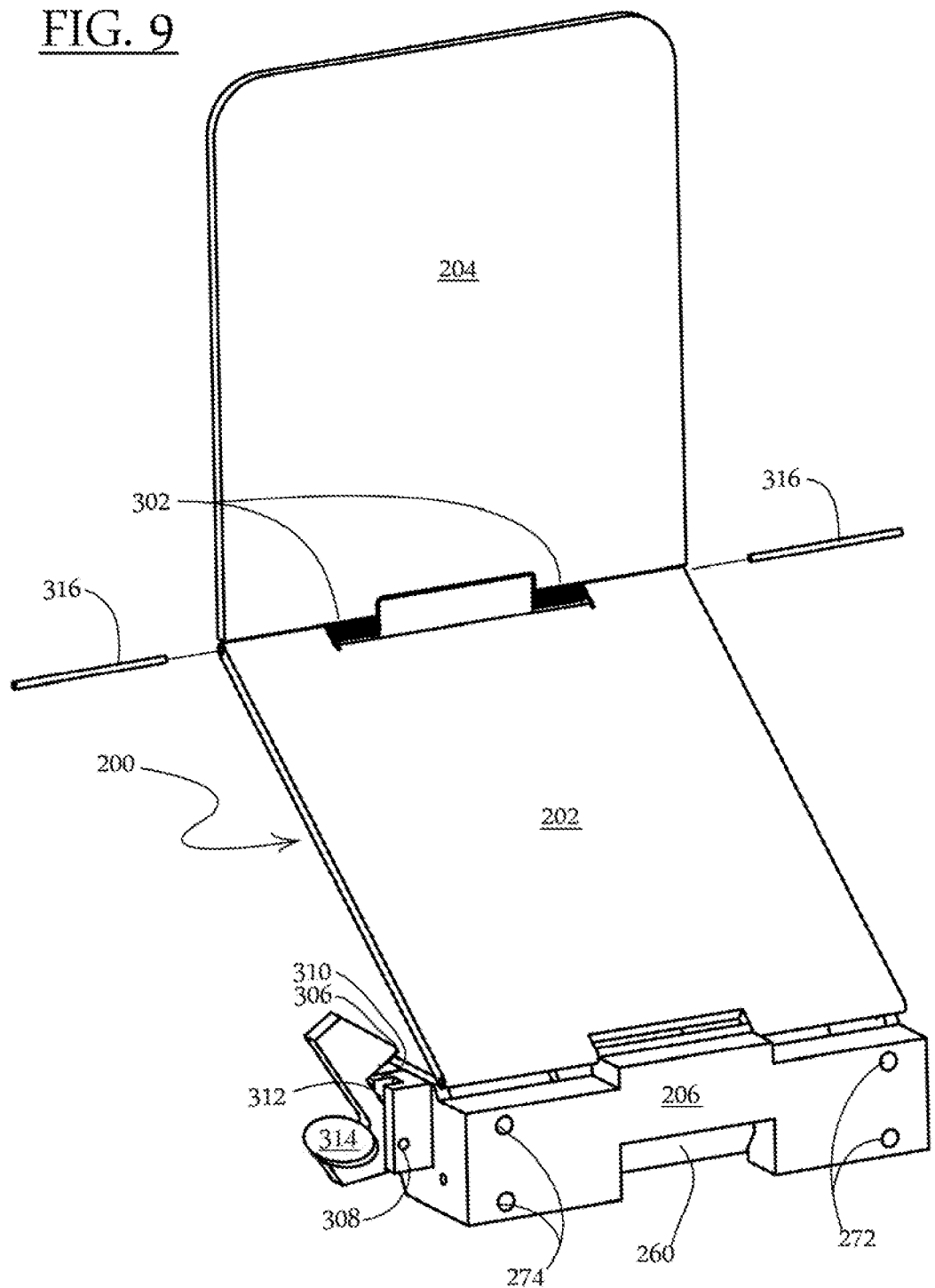
FIG. 9 is an isometric perspective view of the stairway pet apparatus of FIG. 8 in its partially collapsed position without attachment to the stairway door.
Figure 10:
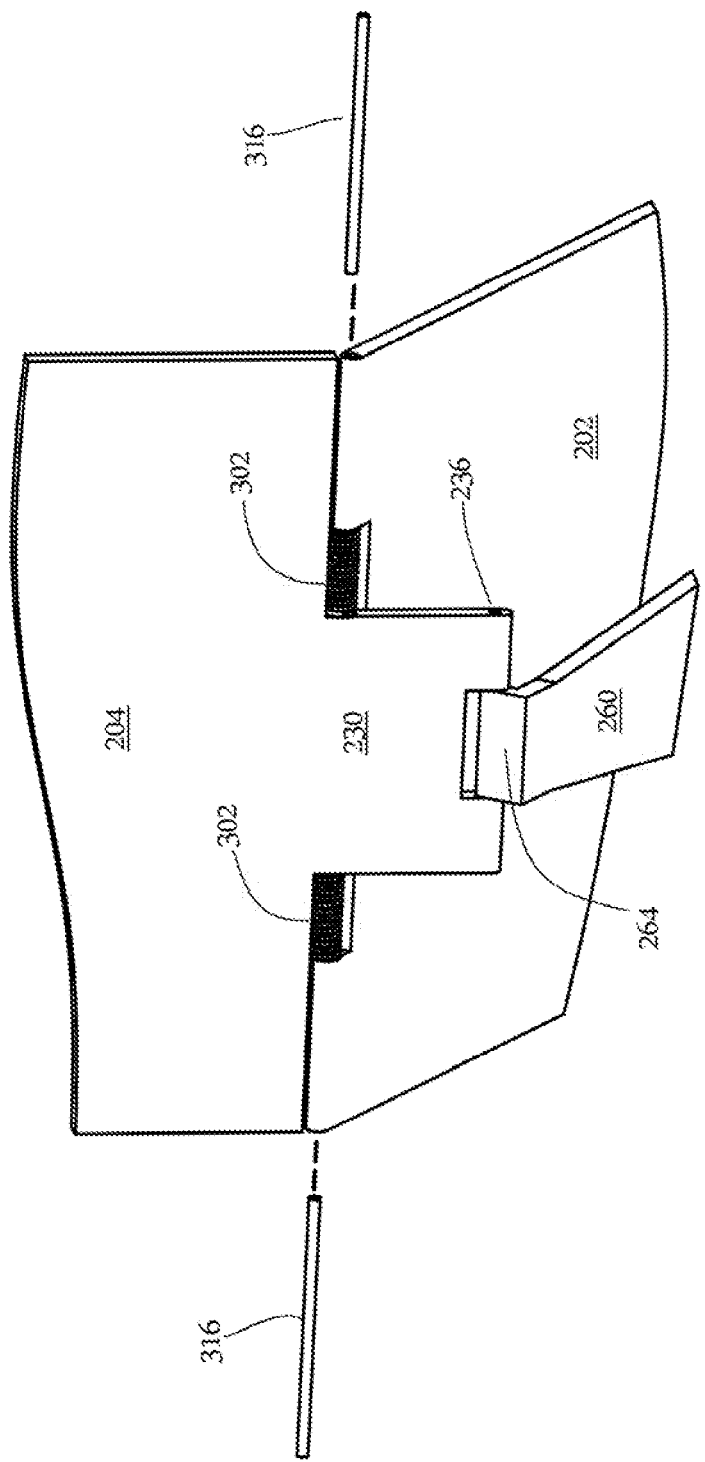
FIG. 10 is a detailed perspective view of the stairway pet apparatus illustrated in FIG. 9 showing the spring activated mechanism in accordance with the fourth embodiment of the invention.

It will be understood that the functioning of the apparatus between the deployed and collapsed positions can be undertaken by either a manual operation (see FIGS. 2, 2A, 3, 4, 5, 6 and 7) or in an automatic spring-loaded operation (see FIGS. 8, 9, and 10).

In the manual operation, ring 282 is secured about the upper side 228 of barrier member 204 which serves as a device for lifting the barrier member 204 and pet apparatus 200 to a substantially vertical position relative to stairway door 120. It will be understood that barrier member 204 and platform member 202 rotate freely about their respective hinge pins 222 and 224. In order to maintain pet apparatus 200 in its collapsed position (see FIG. 2A), a looped cord 283 is attached to ring 282 and connected to a hook 289 situated and fixed at an elevated position on the downstairs side 121 of stairway door 120 above pet door opening 280. It should be noted that when pet apparatus 200 is in its collapsed position, the pet door opening 280 is effectively blocked, thereby denying passage of the household pet through pet door opening 280 and to the lower level of the household or building.

In accordance with a third embodiment of the invention as illustrated in FIGS. 4, 5 and 6, a cord 284 is connected to ring 282 and extended and passed through grommet 286 (placed in opening 288 for that purpose), to the upstairs side 119 of stairway door 120 and attached to securement member 276 as shown in FIG. 6. This is accomplished by means of a second ring 292 attached to the opposite end of cord 284 which is looped onto peg 290. In this manner, stairway pet apparatus 200 can be deployed and collapsed from the entrance side 119 of stairway door 120 without having to open stairway door 120.

As an alternative to using peg 290, detachable securement of second ring 292 to the upstairs side 119 of stairway door 120 is accomplished by inserting second ring 292 into a slot 294 of spring loaded latch 296 as illustrated in FIG. 7. Latch 296 is fixedly secured to the entrance side 119 of stairway door 120 just below pet door opening 280 for this purpose. Once ring 292 is inserted into slot 294, it will trigger and engage with spring-loaded catch 298 for maintaining the pet apparatus 200 in its collapsed position. Release of second ring 292 from slot 294 is accomplished by depressing spring-loaded catch 298 to allow pet apparatus 200 to return to a deployed position.

The foregoing third embodiment that enables pet apparatus 200 to be operated from the upstairs side 119 of door 120 between a collapsed and deployed position relies on the free rotational movement of barrier member 204 and platform member 202 about their respective hinge pins 222 and 224. If it is desired to avoid operation of pet apparatus 200 from the entrance side 119 of stairway door 120, the rotation of hinge pins 222 and 224 can be adjusted with a stiffened resistance by increasing the diameter of these hinge pins such that they would be met with a resistance fit when inserted into their respective openings. This optional method would also apply to increasing the diameter of hinge pins 236 and 256 that engage connecting link 260 with flange 230 and support member 206. In either or both cases, pet apparatus 200 can be manually adjusted to the deployed or collapsed positions, or any position therebetween.

For an automatic operation of pet apparatus between a deployed and collapsed position, a fourth embodiment is illustrated in FIGS. 8, 9 and 10. In this embodiment, and as shown in greater detail in FIG. 10, front hinge pin 316 of FIG. 9 is provided with two torsional springs 302 about hinge pin 316, placed on either side of flange 230 within recess 214. One end of each of the springs is attached about the front side 210 of platform member 202, while their respective opposite ends communicate with the lower sides 232 of flange 230. Springs 302 are biased with sufficient torque to collectively force barrier member 204 and platform member 202, as well as its associated connecting link 260, in an upward, vertical direction about hinge pins 316 and 224, i.e., the torsion producing springs provide a sufficient torque to barrier member 204 and platform member 202 to force them in a vertical direction relative to support member 206 about respective hinge pins 316 and 224. Without anything to restrain the resulting torque of torsional springs 302, stairway pet apparatus 200 will remain in its vertical collapsed position adjacent to stairway door 120.

Inasmuch as the stairway pet apparatus 200 will not be raised or lowered while the pet is standing on platform member 202, the amount of torque required from torsional springs 302 will be limited to lifting the pet apparatus from its deployed position to its collapsed position. The torque offered by torsional springs 302 must therefore be sufficient to move and maintain the entire weight of barrier member 204, platform member 202 and connecting link 260 to a vertical collapsed position. The torque required will depend on the materials used for the pet apparatus and their corresponding weight. The ratings of torque for the torque springs utilized herein are readily available for a person skilled in the art and can be selected so that the force needed to move the apparatus from a deployed to a collapsed position can be easily accomplished. See, for example, Machinery's Handbook, 25th Edition, 1997, pp. 315-324 dealing with wire coil springs. Spiral flat springs or leaf springs can also be used.

As an alternative to inserting torsional springs 302 into recess 214 on either side of flange 230, externally mounted hinges that include their own integral return springs and hinge arrangements (not shown) can be used to provide automatic collapse of platform member 202 and barrier member 204 about support member 206.

Referring to FIG. 8, in order to enable pet apparatus 200 to remain in a deployed position by countering the torsional forces offered by torsional springs 302, a spring loaded, platform locking mechanism 305 is provided about side support member 248 of support member 206. Platform locking mechanism 305 can be provided about either or both of side support members 246, 248. FIG. 8 shows platform locking mechanism 305 attached to side support member 248 for maintaining platform 202 in its deployed position utilizing restraining latch 306. Restraining latch 306 is part of platform locking mechanism 305 and rotates around pin 308 which is held in place between sidewalls 310 and 312. A spring (not shown) is provided between sidewalls 310, 312 to restore the restraining latch 306 to a closed state for maintaining platform 202 in its deployed position. This is illustrated in FIG. 8. Releasing the locking mechanism is accomplished by depressing the flat portion 314 of restraining latch 306 thereby rotating the latch around hinge pin 308 into a released position as shown in FIG. 9. Once released, stairway pet apparatus 200 will automatically spring to a collapsed position adjacent to the downstairs side 121 of stairway door 120 due to the restoring or biasing forces created by torsional coil springs 302.

Figure 11:
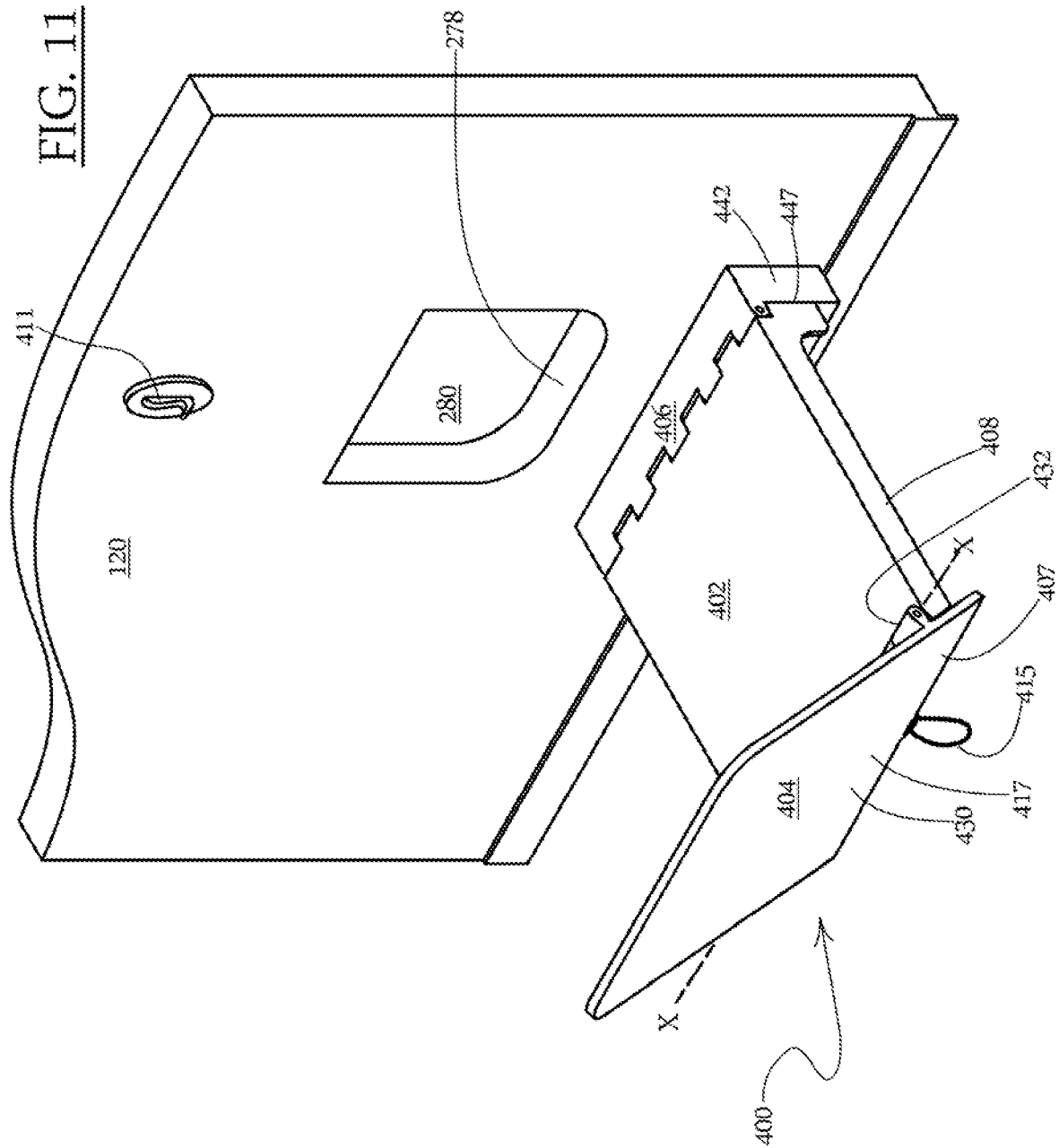
FIG. 11 is an isometric perspective view of a collapsible and foldable stairway pet apparatus in accordance with the fifth embodiment of the invention in its deployed position and attached to the rear of the stairway door below the pet door opening.
Figure 12:
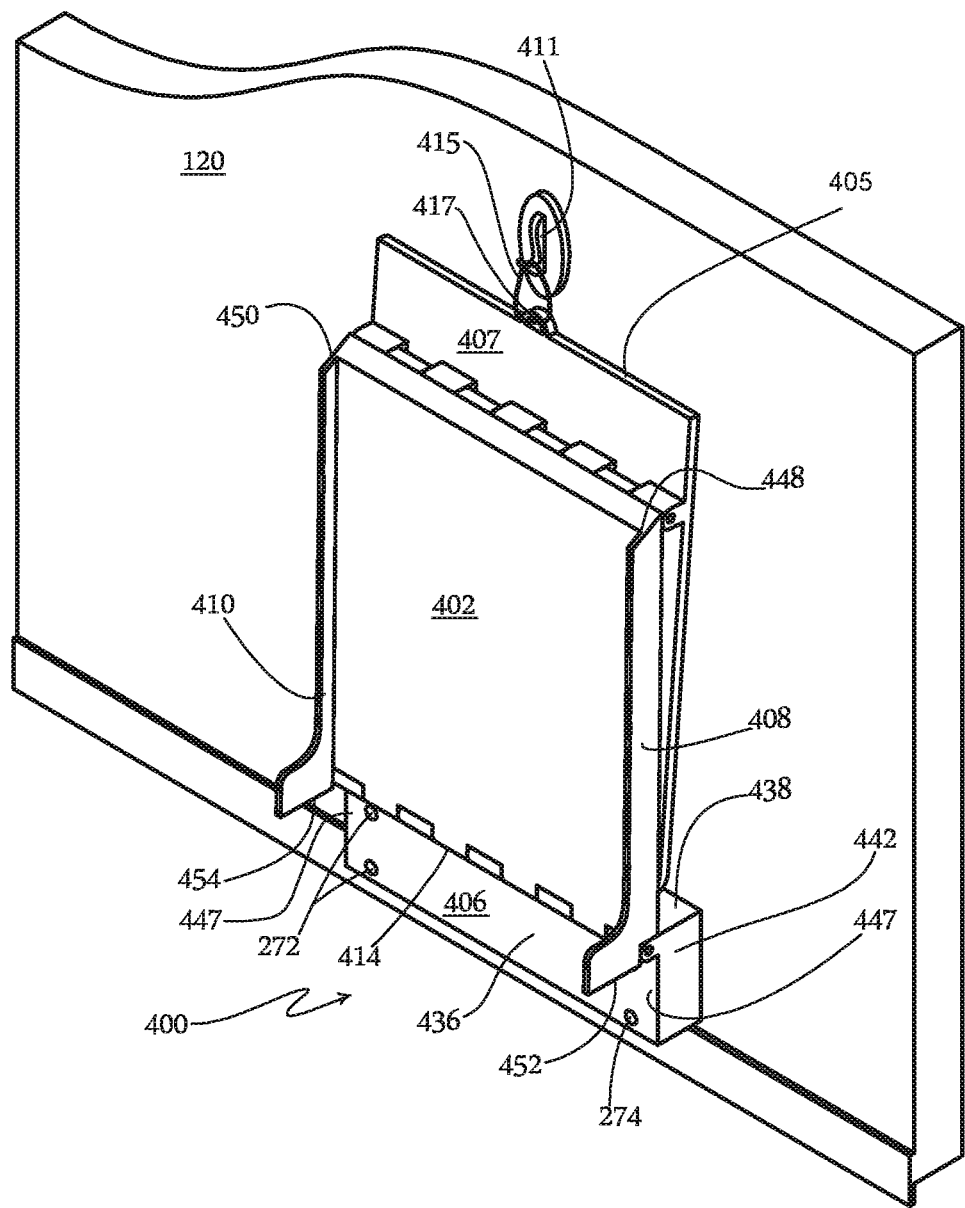
FIG. 12 is an isometric perspective view of the stairway pet apparatus illustrated in FIG. 11 in its collapsible and foldable position adjacent to the rear of the stairway door.
Figure 13:
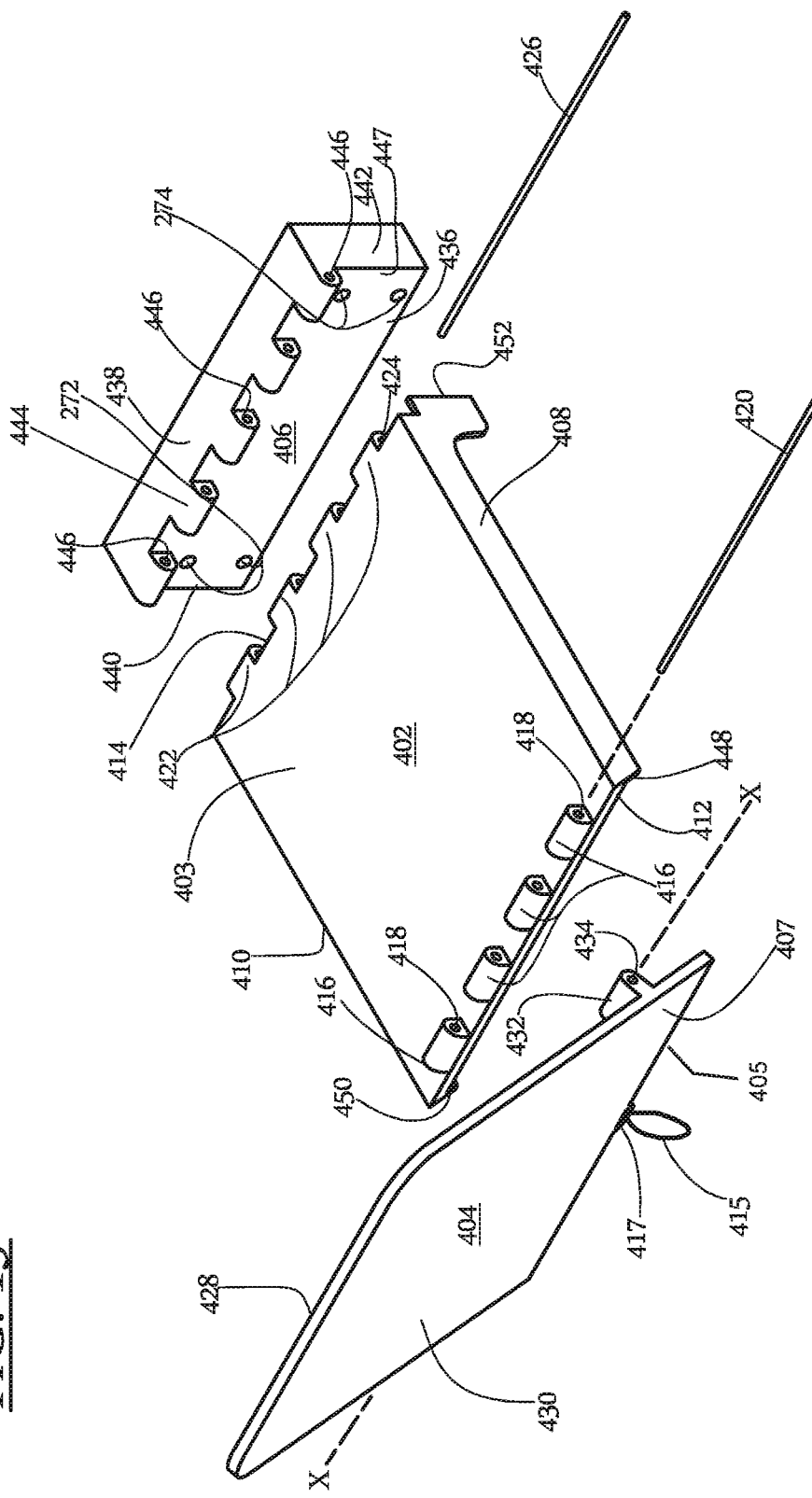
FIG. 13 is a fully exploded isometric perspective view of the collapsible and foldable stairway pet apparatus illustrated in FIG. 11.

As an alternative to the previous embodiments, a fifth embodiment according to the invention is disclosed with the stairway pet apparatus 400 illustrated in FIGS. 11, 12 and 13 in which the stairway pet apparatus is folded and collapsed against the downstairs side 121 of stairway door 120 (FIG. 12). As shown in FIGS. 11 and 12, pet apparatus 400 comprises a barrier member 404, platform member 402 and support member 406. The foldable and collapsible stairway pet apparatus 400 illustrated in FIG. 11 shows the apparatus in its deployed position, i.e., where platform member 402 is substantially perpendicular to support member 406 and door 120, and barrier member 404 is at a slight obtuse angle relative to the horizontal deployed position of platform member 402. As best illustrated in FIGS. 12 and 13, two side supports 408 and 410 are provided which depend from and extend below platform member 402. As illustrated, platform member 402 has a front end 412 and an opposing rear end 414. A series of spaced-apart, hollow pivots 416 are positioned about front end 412 and on the top surface 403 of platform member 402. The hollow portions of pivots 416 are configured to define openings 418 that accommodate the receipt of longitudinal connecting pin 420. Spaced-apart, hollow connecting pivots 422 are also provided and positioned to extend beyond the opposing rear end 414. As with pivots 416, the hollow portions of pivots 422 are configured to define openings 424 to accommodate the receipt of a longitudinal connecting pin 426.

Figure 14:
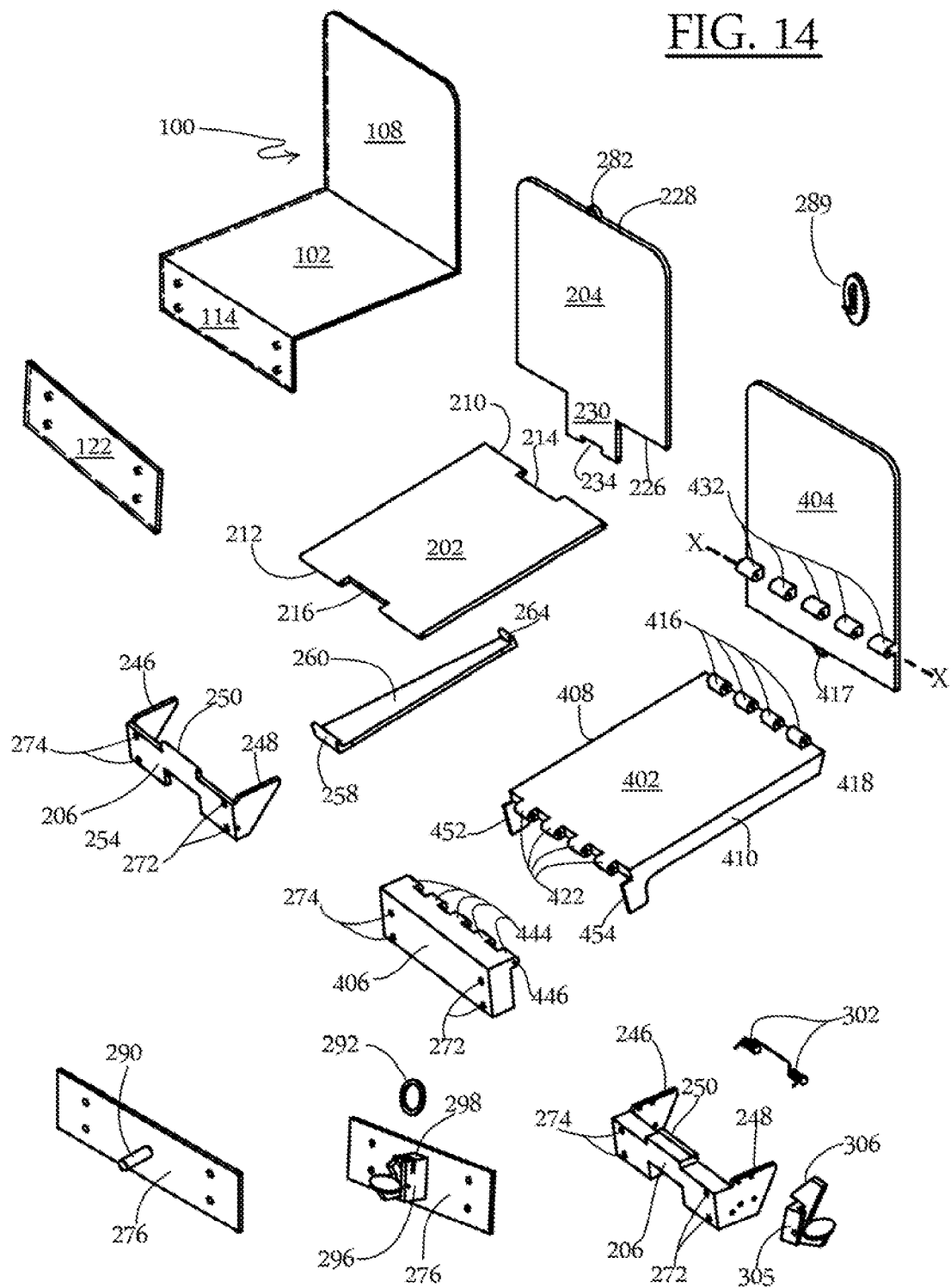
FIG. 14 is an isometric perspective view of the stairway pet apparatus illustrated in FIG. 1, the isolated individual components making up the stairway pet apparatus illustrated in FIGS. 3, 7 and 8, and the isolated individual components making up the stairway pet apparatus illustrated in FIG. 11.

Barrier member 404 has a rigid, generally square or rectangular configuration having a lower side 428 and an upper side 430. A series of spaced-apart, hollow pivots 432 (illustrated in FIG. 14 and partially hidden in FIG. 11) having openings 434 are positioned on the surface of lower side 428 of barrier member 404. In one example, the opening 434 may be a hollow pivot opening. The placement of hollow pivots 432 along pivot axis X-X (where hollow pivots 432 are attached), defines the beginning of a downwardly depending flange 407 which extends to the lower edge 405 of lower side 428 (see FIGS. 13 and 14). The spacing between pivots 416 of platform member 402 and the pivots 432 of barrier member 404 are such that the pivots collectively mate with each other in a frictionless manner to accommodate the receipt of connecting hinge pin 420 through their respective openings 418, 434. In this manner, barrier member 404 is engaged with and hinged to platform member 402 to permit rotation and folding of the lower side 428 of barrier member 404 onto the top surface 403 of platform member 402.

Referring once again to FIGS. 11, 12 and 13, the third component of pet apparatus 400 is support member 406 which is detachably fixed to stairway door 120 at or below pet door opening 280 in the same manner as support member 206 with the use of appropriate fastening means, such as, for example, hex nuts, or wing nuts, and corresponding bolts 268, 270 passed through corresponding openings 272, 274 (see FIG. 2). Support member 406 has a front side 436 facing the stairway, a top side 438, and side supports 440, 442 which are preferably made integrative with support member 406 as a unitary construction. Extending from top side 438 beyond front side 436 are a plurality of spaced-apart hollow pivots 444 having openings 446 configured for the receipt therethrough of connecting hinge pin 426. The extension of pivots 444 beyond front side 436 is such that the lower portion of side supports 440, 442 define a recess 447 whose purpose is to function as a rotational stop for the respective rear end flanges 452 and 454 of the platform side supports 408 and 410. This arrangement insures that platform 402 is horizontally supported at a substantially perpendicular angle to stairway door 120.

Once again, the spacing between pivots 422 of platform member 402 and the pivots 444 of support member 406 are such that the pivots mate with each other to accommodate the receipt of connecting hinge pin 426 through their respective openings 424, 446. In this manner, support member 406 is hinged to platform member 402 to permit the free rotation of the folded barrier member 404 onto platform member 402 about hinge pin 426, in an upward direction as shown in FIG. 12. In FIG. 12, pet apparatus 400 is shown in its folded and collapsed position against the downstairs side 121 of stairway door 120. Once folded and collapsed, pet apparatus 400 can be held in place against stairway door 120 using the same arrangement shown for pet apparatus 200 illustrated in FIGS. 4, 5 and 6, or by any other known fastening means available to those skilled in the art. In the illustration shown in FIG. 12, an attachment ring 417 engaged with a looped cord 415 is provided about the lower edge 405 of backstop 404 the looped cord of which is engaged with hook 411 that is secured to the downstairs side 121 of door 120 above pet door opening 280.

As noted above and in FIGS. 11-13, the deployed position of barrier member 404 relative to the horizontally deployed platform member 402 is set at an obtuse angle which is necessitated by the freely rotating barrier member about connecting pin 420. Otherwise, due to gravitational forces, barrier member 404 would fall freely in a downward direction and not be able to function as an obstruction for directing the household pet onto stairway step 101 (see FIG. 1A) immediately below pet door opening 280 from either the right or left direction of platform member 402. The obtuse angle is determined by flange 407 coming to rest against the rotational stopping surfaces 448 and 450 which define the front ends of side supports 408 and 410. The rotational stopping surfaces of side supports 408 and 410 are configured to position barrier member 404 at the same angle relative to horizontally disposed platform member 402. In order for barrier member 404 to function as an effective obstruction to direct the household pet in a right or left direction after exiting pet door opening 280, the angle between horizontally deployed platform member 402 and barrier member 404 can range from about 95 to 120 degrees, preferably in the range of about 100 to 110 degrees.

It should be noted that the position of barrier member 404 relative to the horizontally deployed platform member 402 can be adjusted to any angle appropriate for creating the necessary obstruction to the household pet by adjusting the rotation of backstop 404 and platform 402 about their respective hinge pins 420 and 426 with a stiffened resistance. The stiffened resistance can be accomplished by increasing the diameter of the hinge pins such that they would meet with a resistance fit when inserted into their respective openings. This method would optionally apply to increasing the diameter of hinge pins 236 and 256 for connecting the connecting link 260 with flange 230 and support member 206. In this manner, pet apparatus 200 can be manually adjusted to the deployed or collapsed position and any position therebetween obviating the need for the formerly described devices for maintaining pet apparatus in its vertical collapsed position adjacent to the downstairs side 121 of stairway door 120. Similarly, a stiffened resistance can be provided between the pivoting components, specifically between the pairs of pivots 416 and 432, and pivots 422 and 444. It will be understood that with regard to the pivot and hinge embodiments illustrated in FIGS. 11, 12, 13 and 14 that join barrier member 404 to platform member 402, other functional external hinge assemblies and arrangements (not shown) can be utilized for the engagement and folding of the barrier member over the platform member.

The various components of the pet apparatus embodiments disclosed herein can be made from any one or a combination of a variety of materials including hardened plastic, e.g., polyethylene or ABS, metal, wood or similar materials that offer sufficient strength and construction to withstand the combined forces exerted on them. The combined forces include the weight of the materials making up the components of the stairway pet apparatus; the weight of the pet; the inertial forces created by the mechanism itself as it is deployed and collapsed; as well as those inertial forces exerted by the pet as it jumps onto the platform member. The weight of the pets can range from 1 to 10 pounds, 10 to 25 pounds and 25 to 50 pounds with the latter requiring sufficient stiffening ribs for the platform member. It is therefore critical that the platform member of each of the embodiments herein has a firm supportive surface oriented substantially perpendicular to stairway door 120 for supporting these forces, particularly the weight of the pet involved. In this way, an ergonomically safe, and a non-deflective, firm surface for the pet to step, stand, and/or to sit in-place on during its passage through the pet door opening in its migration to the lower level of the house or building, is accomplished. The basic shape of the platform members illustrated in the various FIGS. herein has a generally rectangular or square configuration, but other flat geometric shapes are contemplated in accordance with the scope of the invention herein, e.g., one having multiple sides beyond a rectangle or square. The backstop of the pet apparatus must be of sufficient dimension to prevent the pet from bypassing it and also to cause the pet to change direction.

The support member is a structural member that is part of the hardware used to attach the platform member and barrier member to the stairway door 120. The purpose of support members 114, 206 and 406, therefore, is to increase the effectiveness of the fasteners used to attach the platform member and barrier member to the stairway door 120 by distributing the load pressure over a wider surface area on the stairway door.

While the pet apparatus embodiments according to the invention herein are likely to find most use for cats and small dogs needing to travel from floor to floor to obtain access to food, litter boxes, sleeping area or other activities, its use can be extended to other household pets that include rabbits, monkeys, ferrets, gerbils or other domesticated creatures whose travel path up or down a stairway requires a stepping platform when traveling through a pet door opening.

It is to be recognized that specific orientation of a component depicted or described in the specification (e.g., upstairs side 119) is not intended to be limiting, and variations of an orientation or arrangement of a specific part or component described in the specification may be implemented by a person of ordinary skill.

The following is a list of reference numerals and associated parts as used in this specification and drawings:

| Reference Numeral | Part |
| --- | --- |
| 100 | stairway pet apparatus |
| 101 | stairway step |
| 102 | platform member |
| 104 | top surface |
| 106 | bottom surface |
| 108 | barrier member |
| 110 | inner surface |
| 112 | outer surface |
| 114 | support member |
| 116 | upper edge |
| 118 | lower edge |
| 119 | upstairs side of door |
| 120 | stairway door |
| 121 | downstairs side of door |
| 122 | rigid placement member |
| 124 | pet door opening |
| 126 | nuts and bolts |
| 127 | nuts and bolts |
| 128 | openings |
| 129 | openings |
| 130 | bottom |
| 200 | collapsible stairway pet apparatus |
| 202 | platform member |
| 204 | backstop member |
| 206 | support member |
| 206 | support member |
| 210 | front side |
| 210 | rear sides |
| 212 | rear side |
| 214 | recess |
| 216 | recess |
| 218 | hollow opening |
| 218 | front hollow opening |
| 220 | hollow openings |
| 222 | hinge pin |
| 224 | hinge pin |
| 226 | lower side |
| 228 | upper side |
| 230 | flange |
| 230 | flange |
| 232 | lower side |
| 234 | flange recess |
| 235 | hollow opening |
| 236 | hinge pin |
| 238 | upper portion |
| 240 | opening |
| 242 | upper and lower sides |
| 244 | upper and lower sides |
| 246 | side support member |
| 248 | side support member |
| 250 | upwardly extending flange |
| 252 | longitudinal hollow opening |
| 254 | lower side recess |
| 256 | hinge pin |
| 258 | rear portion |
| 260 | connecting link |
| 262 | longitudinal hollow opening |
| 264 | front portion |
| 266 | longitudinal hollow opening |
| 268 | bolts |
| 270 | bolts |
| 271 | wing nut or hex nut |
| 272 | openings |
| 274 | openings |
| 276 | securement member |
| 278 | lower edge |
| 280 | pet door opening |
| 282 | ring |
| 283 | looped cord |
| 284 | cord |
| 286 | grommet |
| 288 | opening |
| 289 | hook |
| 290 | peg |
| 292 | second ring |
| 294 | slot |
| 296 | latch |
| 298 | spring-loaded catch |
| 302 | torsional spring |
| 305 | platform locking mechanism |
| 306 | restraining latch |
| 308 | hinge pin |
| 310 | sidewalls |
| 312 | sidewalls |
| 314 | flat portion |
| 316 | hinge pins |
| 400 | collapsible stairway pet apparatus |

-continued

| Reference Numeral | Part |
| --- | --- |
| 402 | platform member |
| 403 | top surface |
| 404 | barrier member |
| 405 | lower edge |
| 406 | support member |
| 407 | flange |
| 408 | side support |
| 410 | side support |
| 411 | hook |
| 412 | front end |
| 414 | rear end |
| 415 | looped cord |
| 416 | pivots |
| 417 | attachment ring |
| 418 | openings |
| 420 | connecting pin |
| 422 | pivots |
| 424 | openings |
| 426 | hinge pin |
| 428 | lower side |
| 430 | upper side |
| 432 | pivots |
| 434 | opening |
| 436 | front side |
| 438 | top side |
| 440 | side supports |
| 442 | side support |
| 444 | pivot |
| 446 | opening |
| 447 | recess |
| 448 | rotational stopping surface |
| 450 | rotational stopping surface |
| 452 | rear end flange |
| 454 | rear end flange |

The scope of the claims should not be limited by the preferred embodiments and examples described herein, but should be given the broadest interpretation consistent with the written description as a whole.

What is claimed is:

1. A foldable and collapsible stairway pet apparatus for preventing a household pet from traveling in a straight and downward directional movement along a stairway leading from a pet door opening in a stairway door that faces the stairway, comprising:

(a) a rigid platform member having a planar configuration comprising opposing first and second sides, said first side being provided with a first hinge and said second side being provided with a second hinge, and said rigid platform member further comprising at least two side supports, each with front and rear ends, said side supports underlying and depending from the rigid platform member for supporting the rigid platform member;

(b) a rigid barrier member having a top and bottom surface, and upper and lower sides, the bottom surface of the barrier member being connected to the first hinge of the rigid platform member about the lower side thereof, and a flange that downwardly extends from the lower side of the barrier member, said flange being configured to rest against the front ends of the side supports of the rigid platform member when the barrier member is rotated about the first hinge to a deployed upright position relative to the rigid platform member;

(c) a support member comprising opposing front and back sides, said front side of the support member being connected to the second hinge of the rigid platform member for rotational movement of the rigid platform member about the second hinge in an upward direction relative to said stairway door, and being configured for receiving the rear ends of the side supports for maintaining the platform member in a substantially perpendicular position relative to said stairway door; and said back side of the support member being configured for detachable, fixed engagement with said stairway door;

wherein a length of the barrier member is less than a length of the rigid platform member for accommodating the rotation of the bottom surface of the barrier member onto a top surface of the rigid platform member which defines a folded state, and for accommodating the upward rotational movement of both the barrier member and rigid platform member in their folded state about the second hinge to a collapsed state relative to said stairway door.

2. The apparatus of claim 1, wherein the apparatus additionally comprises an attachment mechanism configured to be disposed on a back side of the stairway door to maintain the apparatus in its collapsed state.

3. The apparatus of claim 2, wherein the attachment mechanism comprises a hook configured to be secured to the stairway door and a ring secured about the upper side of the barrier member for engagement of the ring with said hook.

4. The apparatus of claim 2, wherein the flange and barrier member are of an integral construction.

5. The apparatus of claim 4, wherein the flange of the barrier member and front ends of the side supports are configured for maintaining the barrier member in its deployed state at an obtuse angle relative to the top surface of the rigid platform member.

6. The apparatus of claim 5, wherein the obtuse angle is from 100 to 120 degrees.

* * * * *